United States Patent
Zhao et al.

(10) Patent No.: US 11,985,709 B2
(45) Date of Patent: *May 14, 2024

(54) RANDOM ACCESS METHOD, USER EQUIPMENT, BASE STATION, AND RANDOM ACCESS SYSTEM

(71) Applicant: HUAWEI TECHNOLOGIES CO., LTD., Shenzhen (CN)

(72) Inventors: Hongyi Zhao, Shanghai (CN); Jinfang Zhang, Shenzhen (CN); Lei Lu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 160 days.

This patent is subject to a terminal disclaimer.

(21) Appl. No.: 17/682,509

(22) Filed: Feb. 28, 2022

(65) Prior Publication Data
US 2022/0256616 A1    Aug. 11, 2022

Related U.S. Application Data

(63) Continuation of application No. 16/576,785, filed on Sep. 20, 2019, now Pat. No. 11,284,442, which is a (Continued)

(51) Int. Cl.
*H04W 74/0833* (2024.01)
*H04L 5/00* (2006.01)
(Continued)

(52) U.S. Cl.
CPC ....... *H04W 74/0833* (2013.01); *H04L 5/0048* (2013.01); *H04L 5/0051* (2013.01); *H04L 27/2602* (2013.01); *H04W 72/044* (2013.01)

(58) Field of Classification Search
CPC ............ H04W 74/0833; H04W 72/044; H04L 5/0048; H04L 5/0051; H04L 27/2602
See application file for complete search history.

(56) References Cited

U.S. PATENT DOCUMENTS 8,169,992 B2   5/2012   Parkvall et al.
8,717,996 B2   5/2014   Parkvall et al.
(Continued)

FOREIGN PATENT DOCUMENTS

CN   101102298 A   1/2008
CN   102548015 A   7/2012
(Continued)

OTHER PUBLICATIONS

NTT Docomo, Inc. (Rapporteur), Update of TR 38.801 (v061). 3GPP TSG-RAN WG3 #94, Nov. 14-Nov. 18, 2016, Reno, Nevada, USA, R3-163034, 56 pages.
(Continued)

*Primary Examiner* — Deepa Belur
(74) *Attorney, Agent, or Firm* — HAUPTMAN HAM, LLP

(57) ABSTRACT

A random access method includes determining, by a user equipment (UE), a preamble sequence. The method also includes generating, by the UE, a scrambling code. The scrambling code is based on the preamble sequence. The method further includes scrambling, by the UE, data based on the scrambling code to obtain scrambled data. The method additionally includes determining, by the UE based on a predetermined resource mapping relationship, time-frequency resources for sending the scrambled data. The method also includes sending, by the UE on the determined time-frequency resources, the scrambled data to a base station.

20 Claims, 19 Drawing Sheets

Related U.S. Application Data continuation of application No. PCT/CN2018/077103, filed on Feb. 24, 2018.

(51) Int. Cl.
*H04L 27/26* (2006.01)
*H04W 72/044* (2023.01)

(56) References Cited

U.S. PATENT DOCUMENTS

| | | | |
|---|---|---|---|
| 10,004,088 B2 | 6/2018 | Baker et al. | |
| 2010/0314609 A1 | 12/2010 | Yu et al. | |
| 2011/0243108 A1* | 10/2011 | Park | H04W 48/16 455/434 |
| 2014/0177607 A1 | 6/2014 | Li et al. | |
| 2015/0016433 A1 | 1/2015 | Ramos et al. | |
| 2016/0029358 A1 | 1/2016 | Hou et al. | |
| 2016/0112168 A1* | 4/2016 | Yoo | H04W 16/14 370/280 |
| 2016/0308635 A1* | 10/2016 | Zhou | H04W 52/04 |
| 2017/0171846 A1 | 6/2017 | Zhao et al. | |
| 2017/0251499 A1* | 8/2017 | Radulescu | H04W 48/16 |
| 2017/0366996 A1 | 12/2017 | Park et al. | |
| 2019/0350005 A1 | 11/2019 | Liu et al. | |
| 2019/0387551 A1* | 12/2019 | Liu | H04L 5/0053 |
| 2020/0288506 A1* | 9/2020 | Lei | H04W 74/0833 |

FOREIGN PATENT DOCUMENTS

| | | |
|---|---|---|
| CN | 103748942 A | 4/2014 |
| CN | 105122662 A | 12/2015 |
| CN | 105379357 A | 3/2016 |
| WO | 2009020423 A1 | 2/2009 |
| WO | 2015122701 A1 | 8/2015 |
| WO | 2016089146 A1 | 6/2016 |

OTHER PUBLICATIONS

Chinese Office Action issued in corresponding Chinese Application No. 202010480510.9, dated Jan. 4, 2022, pp. 1-5.

* cited by examiner

RANDOM ACCESS METHOD, USER EQUIPMENT, BASE STATION, AND RANDOM ACCESS SYSTEM

CROSS-REFERENCE TO RELATED APPLICATIONS

This application is a continuation of U.S. patent application Ser. No. 16/576,785, filed on Sep. 20, 2019, which is a continuation of International Application No. PCT/CN2018/077103 filed on Feb. 24, 2018, which claims priority to Chinese Patent Application No. 201710166657.9, filed on Mar. 20, 2017. All of the afore-mentioned patent applications are hereby incorporated by reference in their entireties.

TECHNICAL FIELD

This application relates to the field of wireless communications technologies, and in particular, to a random access method, user equipment (English: User Equipment, UE), a base station, and a random access system.

BACKGROUND

To access a wireless network and send uplink data, UE needs to establish a connection to a cell by using a random access process and obtain uplink synchronization. In long term evolution (English: Long Term Evolution, LTE), the following six events trigger the random access process.
1. Establishment of a wireless connection during initial access: The UE switches from a radio resource control_Idle (Radio Resource Control_IDLE, RRC_IDLE) state to a radio resource control_connected (Radio Resource Control_CONNECTED, RRC_CONNECTED) state.
2. RRC connection re-establishment procedure (RRC Connection Re-establishment procedure): This procedure is performed, so that the UE re-establishes a wireless connection after a radio link failure (Radio Link Failure).
3. Handover (handover): In this case, the UE needs to establish uplink synchronization with a new cell.
4. In an RRC_CONNECTED state, downlink data arrives, and when the UE needs to return ACK/NACK to a network side, the UE is "unsynchronized" with the network side on an uplink.
5. In an RRC_CONNECTED state, uplink data arrives, for example, when the UE needs to report a measurement report or send user data to a network side, the UE is "unsynchronized" with the network side on an uplink or no available physical uplink control channel (English: Physical Uplink Control Channel, PUCCH) resource is used to transmit a scheduling request (English: Scheduling Request, SR).
6. In an RRC_CONNECTED state, to locate the UE, a timing advance (timing advance) is required.

Random access processes are usually classified into a "contention-based" access process and a "non-contention-based" access process. For example, the "contention-based" access process is applicable to the first five events, and the "non-contention-based" access process is applicable to three events: the third, fourth, and sixth events.

The contention-based random access process includes the following four steps:
Step 1. UE transmits a random access preamble (English: Preamble) sequence to a base station by using a message 1 (MSG 1).
Step 2. The base station sends a random access response (English: Random Access Response, RAR) to the UE by using a message 2 (MSG 2).
Step 3. The UE sends a layer 2/layer 3 (English: Layer 2/Layer 3, L2/L3) message to the base station by using a message 3 (MSG 3).
Step 4. The base station sends a contention conflict resolution message to the UE by using a message 4 (MSG 4).

When the UE sends the MSG 1, usually, a spectrum shift is performed on a generated preamble, the preamble is converted into time domain data, and then the time domain data is directly configured on a subcarrier. A preamble obtained after the foregoing processing is sent through an antenna port of the UE.

As new services such as an Internet of things service are popularized, some services having a small data volume but relatively high delay requirement need to be served in time. In terms of an access delay, it is difficult to meet the delay requirement of the services in the contention-based random access process.

SUMMARY

Embodiments of this application provide a random access method, to resolve a prior-art problem of relatively long service delay.

According to a first aspect, a random access method is provided, including: after obtaining downlink synchronization with a cell, determining, by user equipment UE, a preamble sequence of the UE in the cell, where the UE has not obtained uplink synchronization with the cell; obtaining, by the UE, service data; determining, by the UE, a scrambling code, where the scrambling code is in a one-to-one correspondence with the preamble sequence, or the scrambling code is in a one-to-one correspondence with an identifier of the UE, or the scrambling code is in a one-to-one correspondence with a combination of the preamble sequence and an identifier of the UE; scrambling, by the UE, the service data based on the scrambling code, to obtain scrambled service data; configuring, by the UE based on a predetermined resource mapping relationship, time-frequency resources respectively occupied by the preamble sequence and the scrambled service data; sending, by the UE on the configured time-frequency resources, the preamble sequence and the scrambled service data to a base station to which the cell belongs; and receiving, by the UE, a random access response sent by the base station based on the preamble sequence.

In the random access method provided in this embodiment of this application, when the UE sends an MSG 1, the UE sends the preamble sequence and the service data to the base station on the configured time-frequency resources. In other words, the MSG 1 carries both the preamble and the service data. In this way, the base station may obtain the service data from the received MSG 1 in time, to provide a service for the UE. Therefore, the base station does not need to wait for completion of a random access process before obtaining service data that is transmitted by the UE by using an extra time-frequency resource, thereby reducing a service delay.

In a possible design, the scrambling code is in a one-to-one correspondence with the preamble sequence, and the determining a scrambling code includes: receiving, by the UE, a first scrambling code mapping indication sent by the base station, where the first scrambling code mapping indication is used to indicate a mapping mode of a preamble sequence and a scrambling code; and determining, by the UE, the scrambling code in a one-to-one correspondence with the preamble sequence based on the mapping mode and the preamble sequence.

In a possible design, the mapping mode includes:
if the preamble sequence is a Zadoff-Chu ZC sequence that has a length N and that is generated by using u as a root, the scrambling code is the preamble sequence, where N is a natural number greater than 1, u is a natural number, and 0≤u<N; or
if the preamble sequence is a ZC sequence that has a length N and that is generated by using u as a root, the scrambling code is ½ of the preamble sequence; or
if the preamble sequence is a ZC sequence that has a length N and that is generated by using u as a root, the scrambling code is ¼ of the preamble sequence; or
if the preamble sequence is a ZC sequence that has a length N and that is generated by using u as a root, the scrambling code is a ZC sequence that has a length M and that is generated by using v as a root, where each of N and M is a natural number greater than 1, each of u and v is a natural number, 0≤u<N, and 0≤v<M; or
if the preamble sequence is a ZC sequence that has a length N and that is generated by using u as a root, the scrambling code is another sequence in a one-to-one correspondence with the preamble sequence in a predetermined codebook, where the predetermined codebook includes a one-to-one correspondence between the another sequence and the ZC sequence that has a length N and that is generated by using u as a root.

In a possible design, the first scrambling code mapping indication is notified by the base station to the UE by using a physical broadcast channel (English: Physical Broadcast Channel, PBCH), or is notified by the base station to the UE by using a system information (English: System Information, SI) message, or is notified by the base station to the UE by using a physical downlink control channel (English: Physical Downlink Control Channel, PDCCH).

In a possible design, the scrambling code is in a one-to-one correspondence with the identifier of the UE, and the determining a scrambling code includes: receiving, by the UE, a second scrambling code mapping indication sent by the base station, where the second scrambling code mapping indication is used to indicate a mapping mode of a preamble sequence and an identifier of the UE; and determining, by the UE, the scrambling code in a one-to-one correspondence with the identifier of the UE based on the mapping mode and the identifier of the UE.

In a possible design, the mapping mode includes: If the UE is in an RRC_CONNECTED state or an RRC_INACTIVE state, the scrambling code is a ZC sequence in a one-to-one correspondence with the identifier of the UE in a predetermined codebook.

In a possible design, the second scrambling code mapping indication is notified by the base station to the UE by using a PBCH, or is notified by the base station to the UE by using an SI message, or is notified by the base station to the UE by using a PDCCH.

In a possible design, the scrambling code is in a one-to-one correspondence with the combination of the preamble sequence and the identifier of the UE, and the determining a scrambling code includes: receiving, by the UE, a third scrambling code mapping indication sent by the base station to which the cell belongs, where the third scrambling code mapping indication is used to indicate a mapping mode of a preamble sequence and a combination of the preamble sequence and an identifier of the UE; and determining, by the UE, the scrambling code in a one-to-one correspondence with the combination of the preamble sequence and the identifier of the UE based on the mapping mode and the combination of the preamble sequence and the identifier of the UE.

In a possible design, the mapping mode includes: If the UE is in an RRC_CONNECTED state or an RRC_INACTIVE state, the scrambling code is a ZC sequence in a one-to-one correspondence with the combination of the preamble sequence and the identifier of the UE in a predetermined codebook.

In a possible design, the third scrambling code mapping indication is notified by the base station to the UE by using a PBCH, or is notified by the base station to the UE by using an SI message, or is notified by the base station to the UE by using a physical PDCCH.

In a possible design, the configuring, based on a predetermined resource mapping relationship, time-frequency resources respectively occupied by the preamble sequence and the scrambled service data includes: receiving, by the UE, a resource mapping indicator sent by the base station, where the resource mapping indicator is used to indicate the predetermined resource mapping relationship; and configuring, by the UE based on the resource mapping indicator indicated by the resource mapping indicator, the time-frequency resources respectively occupied by the preamble sequence and the scrambled service data.

In a possible design, the resource mapping indicator is notified by the base station to the UE by using a PBCH, or is notified by the base station to the UE by using an SI message, or is notified by the base station to the UE by using a PDCCH.

In a possible design, the predetermined resource mapping relationship includes a time domain resource mapping relationship and a frequency domain resource mapping relationship, where the time domain resource mapping relationship includes:
the preamble sequence occupies first P OFDM symbols in a first radio subframe, and the scrambled service data occupies $(P+1)^{th}$ to $(P+Q)^{th}$ OFDM symbols in the first radio subframe, where each of P and Q is a natural number greater than or equal to 1, and a sum of P+Q is less than a total quantity K of OFDM symbols in the first radio subframe; or
the scrambled service data occupies first Q OFDM symbols in a first radio subframe, and the preamble sequence occupies $(Q+1)^{th}$ to $(P+Q)^{th}$ OFDM symbols in the first radio subframe; or
the preamble sequence occupies last P OFDM symbols in a first radio subframe, and the scrambled service data occupies $(P+1)^{th}$ to $(P+Q)^{th}$ OFDM symbols from the end in the first radio subframe; or
the scrambled service data occupies last Q OFDM symbols in a first radio subframe, and the preamble sequence occupies $(Q+1)^{th}$ to $(P+Q)^{th}$ OFDM symbols from the end in the first radio subframe; or
the preamble sequence occupies first P OFDM symbols in a first radio subframe, and the scrambled service data occupies last Q OFDM symbols in the first radio subframe; or
the scrambled service data occupies first Q OFDM symbols in a first radio subframe, and the preamble sequence occupies last P OFDM symbols in the first radio subframe; or
the preamble sequence occupies first P OFDM symbols in a first radio subframe, a length indicator NI occupies $(P+1)^{th}$ to $(P+I)^{th}$ OFDM symbols in the first radio subframe, the length indicator is used to indicate a quantity J of subframes occupied by the scrambled service data, and the scrambled service data occupies remaining OFDM symbols starting from a $(P+I+1)^{th}$ OFDM symbol in the first radio subframe and OFDM symbols in $1^{st}$ to $J^{th}$ adjacent radio subframes after the first radio subframe, where each of I and J is a natural number greater than or equal to 1; or the preamble sequence occupies first P OFDM symbols in a first radio subframe, and the scrambled service data occupies remaining OFDM symbols starting from a $(P+1)^{th}$ OFDM symbol in the first radio subframe and OFDM symbols in $1^{st}$ to $J^{th}$ adjacent radio subframes after the first radio subframe, where an end indicator occupies last L OFDM symbols in the $J^{th}$ radio subframe, and the end indicator is used to indicate that transmission of the scrambled service data is completed; and the frequency domain resource mapping relationship includes:

the preamble sequence and the scrambled service data respectively occupy different symbols in a first subcarrier, and the first subcarrier includes X subcarriers, where X is a natural number greater than or equal to 1; or the preamble sequence occupies symbols in a first subcarrier, the scrambled service data occupies symbols in the first subcarrier, the first subcarrier includes X subcarriers, and a second subcarrier includes Y subcarriers, where each of X and Y is a natural number greater than 1.

In a possible design, the scrambling, by the UE, the service data based on the scrambling code includes: coding, by the UE, the service data based on a predetermined coding scheme, to obtain coded service data; and scrambling, by the UE, the coded service data based on the scrambling code.

The service data is coded before being scrambled. In this way, efficiency of coding the service data can be increased, and decoding accuracy of the base station can be improved.

In a possible design, before the coding, by the UE, the service data based on a predetermined coding scheme, the method further includes: receiving, by the UE, a coding scheme indicator sent by the base station, where the coding scheme indicator is used to indicate the predetermined coding scheme.

In a possible design, the coding scheme indicator is notified by the base station to the UE by using a PBCH, or is notified by the base station to the UE by using an SI message, or is notified by the base station to the UE by using a PDCCH.

In a possible design, the random access response includes response data, and the response data is generated by the base station based on the service data.

In a possible design, after the receiving, by the UE, a random access response sent by the base station based on the preamble sequence, the method further includes: receiving response data sent by the base station, where the response data is generated by the base station based on the service data.

According to a second aspect, a random access method is provided, including: determining, by a base station based on a predetermined resource mapping relationship, time-frequency resources respectively occupied by a preamble sequence and service data that are in a cell covered by the base station; receiving, by the base station on the determined time-frequency resources, the preamble sequence and the service data that are sent by UE, where the UE has obtained downlink synchronization with the cell, but has not obtained uplink synchronization with the cell; determining, by the base station, a scrambling code, where the scrambling code is in a one-to-one correspondence with the received preamble sequence, or the scrambling code is in a one-to-one correspondence with an identifier of the UE, or the scrambling code is in a one-to-one correspondence with a combination of the received preamble sequence and an identifier of the UE; descrambling, by the base station based on the scrambling code, the service data sent by the UE, to obtain descrambled service data; and sending, by the base station, a random access response to the UE based on the preamble sequence.

When the base station receives an MSG 1, the base station receives, on the time-frequency resources having a mapping relationship, the preamble sequence and the service data that are sent by the UE. In other words, the MSG 1 carries both the preamble and the service data. Therefore, the base station does not need to provide a service for the UE after waiting for completion of a random access process, thereby reducing a service delay.

In a possible design, before the receiving the preamble sequence and the service data that are sent by UE, the method further includes: sending, by the base station, a resource mapping indicator to the UE, where the resource mapping indicator is used to indicate the predetermined resource mapping relationship.

In a possible design, the resource mapping indicator is notified by the base station to the UE by using a PBCH, or is notified by the base station to the UE by using an SI message, or is notified by the base station to the UE by using a PDCCH.

In a possible design, the predetermined resource mapping relationship includes a time domain resource mapping relationship and a frequency domain resource mapping relationship, where the time domain resource mapping relationship includes:

the preamble sequence occupies first P OFDM symbols in a first radio subframe, and the scrambled service data occupies $(P+1)^{th}$ to $(P+Q)^{th}$ OFDM symbols in the first radio subframe, where each of P and Q is a natural number greater than or equal to 1, and a sum of P+Q is less than a total quantity K of OFDM symbols in the first radio subframe; or the scrambled service data occupies first Q OFDM symbols in a first radio subframe, and the preamble sequence occupies $(Q+1)^{th}$ to $(P+Q)^{th}$ OFDM symbols in the first radio subframe; or the preamble sequence occupies last P OFDM symbols in a first radio subframe, and the scrambled service data occupies $(P+1)^{th}$ to $(P+Q)^{th}$ OFDM symbols from the end in the first radio subframe; or the scrambled service data occupies last Q OFDM symbols in a first radio subframe, and the preamble sequence occupies $(Q+1)^{th}$ to $(P+Q)^{th}$ OFDM symbols from the end in the first radio subframe; or the preamble sequence occupies first P OFDM symbols in a first radio subframe, and the scrambled service data occupies last Q OFDM symbols in the first radio subframe; or the scrambled service data occupies first Q OFDM symbols in a first radio subframe, and the preamble sequence occupies last P OFDM symbols in the first radio subframe; or the preamble sequence occupies first P OFDM symbols in a first radio subframe, and the scrambled service data occupies $(P+1)^{th}$ to $(P+Q)^{th}$ OFDM symbols in the first radio subframe; or the preamble sequence occupies first P OFDM symbols in a first radio subframe, a length indicator NI occupies $(P+1)^{th}$ to $(P+I)^{th}$ OFDM symbols in the first radio subframe, the length indicator is used to indicate a quantity J of subframes occupied by the scrambled service data, and the scrambled service data occupies remaining OFDM symbols starting from a $(P+I+1)^{th}$ OFDM symbol in the first radio subframe and OFDM symbols in $1^{st}$ to $J^{th}$ adjacent radio subframes after the first radio subframe, where each of I and J is a natural number greater than or equal to 1; or the preamble sequence occupies first P OFDM symbols in a first radio subframe, and the scrambled service data occupies remaining OFDM symbols starting from a $(P+1)^{th}$ OFDM symbol in the first radio subframe and OFDM symbols in $1^{st}$ to $J^{th}$ adjacent radio subframes after the first radio subframe, where an end indicator occupies last L OFDM symbols in the $J^{th}$ radio subframe, and the end indicator is used to indicate that transmission of the scrambled service data is completed; and the frequency domain resource mapping relationship includes:

the preamble sequence and the scrambled service data respectively occupy different symbols symbols in a first subcarrier, and the first subcarrier includes X subcarriers, where X is a natural number greater than or equal to 1; or the preamble sequence occupies symbols in a first subcarrier, the scrambled service data occupies symbols in the first subcarrier, the first subcarrier includes X subcarriers, and the second subcarrier includes Y subcarriers, where each of X and Y is a natural number greater than 1.

In a possible design, the scrambling code is in a one-to-one correspondence with the preamble sequence, and before the receiving the preamble sequence and the service data that are sent by UE, the method further includes: sending, by the base station, a first scrambling code mapping indication to the UE, where the first scrambling code mapping indication is used to indicate a mapping mode of a preamble sequence and a scrambling code.

In a possible design, the mapping mode includes:

if the preamble sequence is a Zadoff-Chu ZC sequence that has a length N and that is generated by using u as a root, the scrambling code is the preamble sequence, where N is a natural number greater than 1, u is a natural number, and $0 \le u < N$; or if the preamble sequence is a ZC sequence that has a length N and that is generated by using u as a root, the scrambling code is ½ of the preamble sequence; or if the preamble sequence is a ZC sequence that has a length N and that is generated by using u as a root, the scrambling code is ¼ of the preamble sequence; or if the preamble sequence is a ZC sequence that has a length N and that is generated by using u as a root, the scrambling code is a ZC sequence that has a length M and that is generated by using v as a root, where each of N and M is a natural number greater than 1, each of u and v is a natural number, $0 \le u < N$, and $0 \le v < M$; or if the preamble sequence is a ZC sequence that has a length N and that is generated by using u as a root, the scrambling code is another sequence in a one-to-one correspondence with the preamble sequence in a predetermined codebook, where the predetermined codebook includes a one-to-one correspondence between the another sequence and the ZC sequence that has a length N and that is generated by using u as a root.

In a possible design, the first scrambling code mapping indication is sent by the base station by using a PBCH, or is sent by the base station by using an SI message, or is sent by the base station by using a PDCCH.

In a possible design, the scrambling code is in a one-to-one correspondence with the identifier of the UE, and before the receiving the preamble sequence and the service data that are sent by UE, the method further includes: sending, by the base station, a second scrambling code mapping indication to the UE, where the second scrambling code mapping indication is used to indicate a mapping mode of a preamble sequence and an identifier of the UE.

In a possible design, the mapping mode includes: If the UE is in an RRC_CONNECTED state or an RRC_ACTIVE state, the scrambling code is a ZC sequence in a one-to-one correspondence with the identifier of the UE in a predetermined codebook.

In a possible design, the second scrambling code mapping indication is sent by the base station by using a PBCH, or is sent by the base station by using an SI message, or is sent by the base station by using a PDCCH.

In a possible design, the scrambling code is in a one-to-one correspondence with the combination of the preamble sequence and the identifier of the UE, and before the receiving the preamble sequence and the service data that are sent by UE, the method further includes: sending, by the base station, a third scrambling code mapping indication to the UE, where the third scrambling code mapping indication is used to indicate a mapping mode of a preamble sequence and a combination of the preamble sequence and an identifier of the UE.

In a possible design, the mapping mode includes: If the UE is in an RRC_CONNECTED state or an RRC_INACTIVE state, the scrambling code is a ZC sequence in a one-to-one correspondence with the combination of the preamble sequence and the identifier of the UE in a predetermined codebook.

In a possible design, the third scrambling code mapping indication is sent by the base station by using a PBCH, or is sent by the base station by using an SI message, or is sent by the base station by using a PDCCH.

In a possible design, after the descrambled service data is obtained, the method further includes: generating, by the base station, response data based on the descrambled service data; and sending, by the base station, the response data to the UE, where the response data is carried in the random access response or the response data is sent after the random access response.

In a possible design, after the descrambled service data is obtained, the method further includes: decoding, by the base station, the descrambled service data based on a decoding scheme corresponding to a predetermined coding scheme.

If the UE may code the service data before scrambling the service data, correspondingly, the base station further needs to perform the corresponding decoding after the descrambling. Data transmission reliability can be improved through coding and decoding.

In a possible design, before the receiving the preamble sequence and the service data that are sent by UE, the method further includes: sending, by the base station, a coding scheme indicator to the UE, where the coding scheme indicator is used to indicate the predetermined coding scheme.

In a possible design, the coding scheme indicator is sent by the base station by using a PBCH, or is sent by the base station by using an SI message, or is sent by the base station by using a PDCCH.

In a possible design, the base station generates response data based on the decoded service data; and the base station sends the response data to the UE, where the response data is carried in the random access response or the response data is sent after the random access response.

According to a third aspect, this application provides UE, including a processor, a memory, a transceiver, and an input/output apparatus. The processor is mainly configured to: process a communications protocol and communication data, control the entire user equipment, execute a software program, and process data of the software program. The memory is mainly configured to store the software program and the data. A control circuit is mainly configured to perform conversion between a baseband signal and a radio frequency signal and process the radio frequency signal. The transceiver includes the control circuit and an antenna, and is mainly configured to: receive and send a radio frequency signal in a form of an electromagnetic wave. The processor, the memory, the transceiver, and the input/output apparatus are configured to perform the steps in the random access method provided in the first aspect.

According to a fourth aspect, this application provides a base station, where the base station device includes one or more transceivers and one or more processors, configured to perform the steps in the random access method provided in the second aspect.

According to a fifth aspect, this application provides a random access system, including the UE in any one of the third aspect or the possible designs of the third aspect and the base station in any one of the fourth aspect or the possible designs of the fourth aspect.

According to a sixth aspect, an embodiment of this application provides a computer storage medium, configured to store a computer software instruction used by the foregoing UE, where the computer software instruction includes a program designed to perform any one of the first aspect or the possible implementations of the first aspect.

According to a seventh aspect, an embodiment of this application provides a computer storage medium, configured to store a computer software instruction used by the foregoing base station, where the computer software instruction includes a program designed to perform any one of the second aspect or the possible implementations of the second aspect.

BRIEF DESCRIPTION OF DRAWINGS

To describe the technical solutions in the embodiments of this application more clearly, the following briefly describes the accompanying drawings required for describing the embodiments or the prior art. Apparently, the accompanying drawings in the following descriptions show some embodiments of this application, and a person of ordinary skill in the art may still derive other drawings from these accompanying drawings without creative efforts.

DESCRIPTION OF EMBODIMENTS

Figure 1:
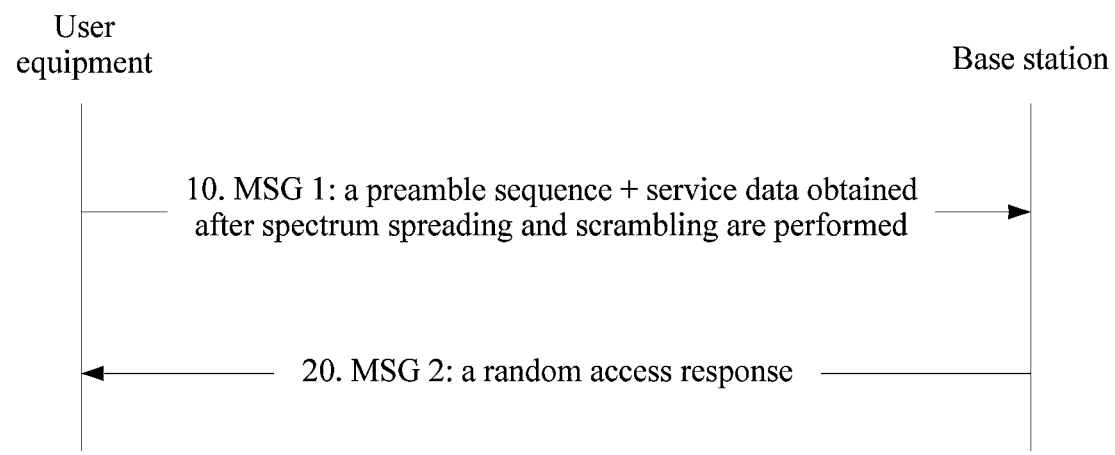
FIG. 1 is a schematic diagram of a random access method according to an embodiment of this application.

In an existing contention-based random access process, message interaction needs to be performed between UE and a base station at least four times, so that uplink synchronization can be obtained and a connection to a cell can be established. In such a random access manner, it is usually difficult to meet a requirement of a service having a small data volume but a very high delay requirement. Specifically, for some services, after a random access process including four steps is completed, service data further needs to be transmitted between the UE and a network side by using more time-frequency resources. For example, in an Internet of things service or an Internet of vehicles service, the UE needs to report measurement parameter values in aspects of a current location, an environment, and the like, so that the network side delivers a control instruction to the UE. In this way, the UE needs to wait a relatively long time before obtaining a service provided by the network side. When the UE obtains the service, a location of a vehicle in which the UE is located and an ambient environment may be different from a location of the vehicle in which the UE is located and an ambient environment that exist when the UE initiates the random access process.

To reduce an access delay, one embodiment provides a random access method. UE adds both a preamble and service data to an MSG 1 in a random access process. In this way, a base station may obtain the service data from the received MSG 1. Therefore, the base station does not need to wait for completion of the random access process before obtaining service data that is transmitted by the UE by using an extra time-frequency resource. The base station may provide a service to the UE based on the service data carried in the MSG 1. Therefore, a service delay can be reduced based on a random access solution provided in this embodiment of this application.

A main implementation principle and example implementations of technical solutions of various embodiments and corresponding advantageous effects that can be achieved by the technical solutions are described below in detail with reference to the accompanying drawings.

To transmit data to a network side, UE first needs to establish a connection to a cell. Downlink synchronization and uplink synchronization are involved in a process of establishing a connection to a cell. The UE obtains downlink synchronization with a cell and system information of the cell by using a cell search process. In addition to performing cell search during power-on, to support mobility, the UE continuously searches neighboring cells, obtains synchronization, and estimates signal received quality of the cell, so that the UE determines, in an RRC_CONNECTED state, whether to perform switching, or the UE determines, in an RRC_IDLE state, whether to perform cell reselection. After obtaining the downlink synchronization, the UE establishes, by using a random access process, uplink synchronization with the cell with which downlink synchronization is obtained.

FIG. 1 is a schematic diagram of a random access method according to one embodiment. The random access method is applicable to a "contention-based" access process and a "non-contention-based" access process. Before step 10 in FIG. 1, UE has obtained downlink synchronization with a cell by using a cell search process, that is, has obtained frequency and symbol synchronization with the cell, has obtained a start position of a downlink frame, and has determined a physical-layer cell identifier (English: Physical-layer Cell Identity, PCI) of the cell. However, the UE has not obtained uplink synchronization with the cell. In the random access method described herein, the cell is a cell with which the UE has obtained downlink synchronization, but has not obtained uplink synchronization in the cell search process, that is, a cell used as a random access target.

Step 10: The UE sends an MSG 1 to a base station to which the cell belongs. The MSG 1 includes both a preamble sequence and scrambled service data. Time-frequency resources respectively occupied by the preamble sequence and the scrambled service data conform to a predetermined resource mapping relationship.

A process in which the UE determines the preamble sequence is similar to that in an existing random access process, and includes obtaining, from a broadcast system information SIB 2 sent by the base station, a resource that can be used to transmit the preamble sequence, and configuring preamble sequence groups for contention-based random access and non-contention-based random access. The UE selects a preamble sequence from the preamble sequence groups based on an estimated size of an MSG 3. Other details about determining the preamble sequence by the UE are not described herein.

After determining the preamble sequence, the UE configures, based on the predetermined resource mapping relationship, the time-frequency resources required for sending the determined preamble sequence and the service data. Then the UE sends, on the configured time-frequency resources, the preamble sequence and service data to the base station to which the cell belongs. The resource mapping relationship and sending the MSG 1 by the UE are described in further detail in the following embodiments.

In various embodiments, the service data includes various types of control information or service information of an application. For example, in an Internet of things service or an Internet of vehicles service, service information of an application may be measurement parameter values in aspects of a current location of the UE, an environment, and the like.

To enable the base station to distinguish between service data from different users, before sending the service data, the UE may scramble the service data based on a scrambling code that is in a one-to-one correspondence with the preamble sequence of the UE.

Step 20: The UE receives an MSG 2 sent by the base station, where the MSG 2 is a random access response. The random access response includes optional information, such as an RA-RNTI, an identifier of the random access preamble sequence, a time advance instruction determined based on an estimated delay between the base station and the UE, a temporary C-RNTI, and an uplink resource allocated to an MSG 3. The UE may determine, based on the RA-RNTI and the identifier of the preamble sequence that are carried in the MSG 2, whether the MSG 2 corresponding to the sent MSG 1 is successfully received, and perform subsequent processing.

If the foregoing steps are performed in the non-contention-based random access, the preamble sequence is used by the UE. Therefore, there is no conflict. In addition, the UE already has a unique identifier C-RNTI in an accessed cell. Therefore, the base station does not need to allocate a C-RNTI to the UE, and the access process is completed. Performing of subsequent steps needs to be continued only in the contention-based random access, to be specific, the UE sends the MSG 3 and receives an MSG 4 sent by the base station. The subsequent steps are basically similar to those in the existing random access process. Details are not described herein again.

In the random access method provided in this embodiment, when the UE sends the MSG 1, the UE sends the preamble sequence and the service data to the base station on the configured time-frequency resources. In other words, the MSG 1 carries both the preamble and the service data. In this way, the base station may obtain the service data from the received MSG 1 in time, to provide a service for the UE. Therefore, the base station does not need to wait for completion of a random access process before obtaining service data that is transmitted by the UE by using an extra time-frequency resource, thereby reducing a service delay.

Figure 2:
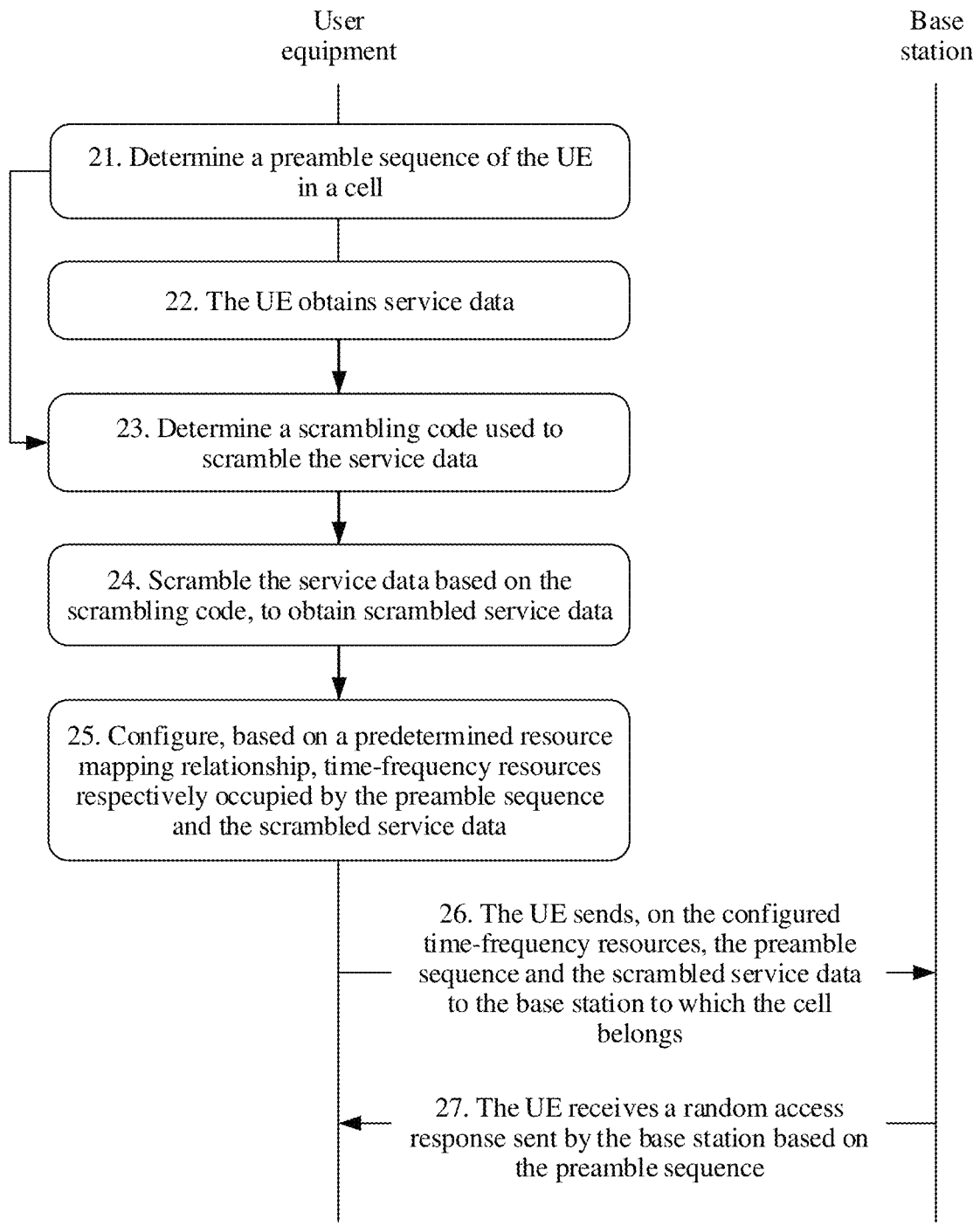
FIG. 2 is a flowchart of a random access method according to an embodiment of this application.

FIG. 2 is a schematic diagram of a random access method according to an embodiment of this application. Implementation details of the random access method are emphasized in FIG. 2 from a perspective of UE.

Step 21: After obtaining downlink synchronization with a cell, the UE determines a preamble sequence of the UE in the cell. A process in which the UE determines the preamble sequence is similar to that in an existing random access process. Details are not described herein. Optionally, the preamble sequence is a Zadoff-Chu ZC sequence, an M sequence, a Golden sequence, or the like.

Step 22: The UE obtains service data. The UE may obtain the service data from an application program installed on the UE.

There is no need to limit an order of performing step 21 and step 22. After step 21 and step 22 are performed, the UE performs step 23.

Step 23: The UE determines a scrambling code used to scramble the service data.

In some embodiments, the scrambling code is in a one-to-one correspondence with the preamble sequence determined in step 21. In this case, an RRC state of the UE is not limited. Alternatively, when the UE is in an RRC_CONNECTED state or an RRC_INACTIVE state, the scrambling code is in a one-to-one correspondence with an identifier of the UE; or the scrambling code is in a one-to-one correspondence with a combination of the preamble sequence determined in step 21 and an identifier of the UE. An RRC_INACTIVE state has the following features: A network side reserves context (context) information of the UE in an RRC_INACTIVE state. The base station and a core network reserve connection information of the UE in an RRC_INACTIVE state. The network side may learn a location of the UE in an RRC_INACTIVE state at an RNA layer. In other words, a network layer may learn a specific RNA in which the UE is located. In this embodiment, the identifier of the UE is a unique identifier of the UE in the base station, and includes a cell radio network temporary identifier (English: Cell Radio Network Temporary Identifier, C-RNTI), a temporary mobile subscriber identity (English: Temporary Mobile Subscriber Identity, TMSI), an international mobile subscriber identity (English: international mobile subscriber identity, IMSI), and the like.

In some embodiments, a manner of determining the scrambling code is learned in advance by the UE and the base station to which the cell belongs. After determining the preamble sequence, the UE may determine the corresponding scrambling code based on the preamble sequence and/or the identifier of the UE.

In some embodiments, the manner of determining the scrambling code is configured on the base station and the UE by default.

In some embodiments, the manner of determining the scrambling code is notified by the base station to the UE by using a scrambling code mapping indication. For example, the base station uses three scrambling code mapping indications to respectively indicate the three correspondences and specific mapping modes.

The scrambling code mapping indications and the specific mapping modes are described below with reference to specific examples.

1. A first scrambling code mapping indication is used to indicate a mapping mode of a preamble sequence and a scrambling code. For example, the first scrambling code mapping indication is 1X, 1 is used to indicate that the scrambling code is in a one-to-one correspondence with the preamble sequence, and X is used to indicate the mapping mode of a preamble sequence and a scrambling code.

The mapping mode of a preamble sequence and a scrambling code includes, but is not limited to, any one of the following (1) to (5).

(1) If the preamble sequence is a Zadoff-Chu ZC sequence that has a length N and that is generated by using u as a root, the scrambling code is the preamble sequence, where N is a natural number greater than 1, u is a natural number, and 0≤u<N. The first scrambling code mapping indication may be 11.

(2) If the preamble sequence is a ZC sequence that has a length N and that is generated by using u as a root, the scrambling code is ½ of the preamble sequence. The first scrambling code mapping indication may be 12.

(3) If the preamble sequence is a ZC sequence that has a length N and that is generated by using u as a root, the scrambling code is ¼ of the preamble sequence. The first scrambling code mapping indication may be 13.

(4) If the preamble sequence is a ZC sequence that has a length N and that is generated by using u as a root, the scrambling code is a ZC sequence that has a length M and that is generated by using v as a root, where each of N and M is a natural number greater than 1, each of u and v is a natural number, 0≤u<N, and 0≤v<M. The first scrambling code mapping indication may be 14.

(5) If the preamble sequence is a ZC sequence that has a length N and that is generated by using u as a root, the scrambling code is another sequence in a one-to-one correspondence with the preamble sequence in a predetermined codebook, where the predetermined codebook includes a one-to-one correspondence between the another sequence and the ZC sequence that has a length N and that is generated by using u as a root. The first scrambling code mapping indication may be 15.

2. A second scrambling code mapping indication is used to indicate a mapping mode of a preamble sequence and an identifier of the UE. For example, the second scrambling code mapping indication is 2X, 2 is used to indicate that the scrambling code is in a one-to-one correspondence with the identifier of the UE, and X is used to indicate the mapping mode of a preamble sequence and an identifier of the UE.

The mapping mode of a preamble sequence and an identifier of the UE includes: If the UE is in an RRC_CONNECTED state or an RRC_ACTIVE state, the scrambling code is a ZC sequence in a one-to-one correspondence with the identifier of the UE in a predetermined codebook. The second scrambling code mapping indication may be 21.

3. A third scrambling code mapping indication is used to indicate a mapping mode of a preamble sequence and a combination of the preamble sequence and an identifier of the UE. For example, the third scrambling code mapping indication is 3X, 3 is used to indicate that the scrambling code is in a one-to-one correspondence with the combination of the preamble sequence and the identifier of the UE, and X is used to indicate the mapping mode of a preamble sequence and a combination of the preamble sequence and an identifier of the UE.

The mapping mode of a preamble sequence and a combination of the preamble sequence and an identifier of the UE includes: The scrambling code is a ZC sequence in a one-to-one correspondence with the combination of the preamble sequence and the identifier of the UE in a predetermined codebook. The third scrambling code mapping indication may be 31.

If the scrambling code is in a one-to-one correspondence with the preamble sequence, the UE receives the first scrambling code mapping indication sent by the base station. The UE determines the scrambling code in a one-to-one correspondence with the preamble sequence based on the mapping mode indicated by the first scrambling code mapping indication and the preamble sequence.

If the scrambling code is in a one-to-one correspondence with the identifier of the UE, the UE receives the second scrambling code mapping indication sent by the base station. The UE determines the scrambling code in a one-to-one correspondence with the identifier of the UE based on the mapping mode indicated by the second scrambling code mapping indication and the identifier of the UE.

If the scrambling code is in a one-to-one correspondence with the combination of the preamble sequence and the identifier of the UE, the UE receives the third scrambling code mapping indication sent by the base station to which the cell belongs. The UE determines the scrambling code in a one-to-one correspondence with the combination of the preamble sequence and the identifier of the UE based on the mapping mode indicated by the third scrambling code mapping indication and the combination of the preamble sequence and the identifier of the UE.

In some embodiments, the base station notifies the UE of one of the three scrambling code mapping indications in any one of the following manners, and notification manners include, but are not limited to, the following manners:
1. The base station notifies the UE of a scrambling code mapping indication by using a PBCH.
2. After a cell search process is completed, the base station notifies the UE of scrambling code mapping by using SI of the cell.
3. For the UE in an RRC_CONNECTED state, an RRC_ACTIVE state, or an RRC_INACTIVE state, the base station notifies the specific UE of scrambling code mapping by using a PDCCH or a dedicated channel.

Step 24: The UE scrambles the service data based on the scrambling code, to obtain scrambled service data.

Scrambling (Scrambling) is encrypting, by using a scrambling code, a signal carrying service data. Data transmission security can be improved through scrambling.

Step 25: The UE configures, based on a predetermined resource mapping relationship, time-frequency resources respectively occupied by the preamble sequence and the scrambled service data.

The predetermined resource mapping relationship is learned in advance by the UE and the base station to which the cell belongs. The UE determines, based on a resource that can be used to transmit the preamble sequence and that is indicated in an SIB 2, the time-frequency resource used to subsequently transmit the preamble sequence, and then determines, based on the time-frequency resource used by the preamble sequence and the predetermined resource mapping relationship, the time-frequency resource correspondingly occupied by the scrambled service data.

In some embodiments, the predetermined resource mapping relationship is configured on the base station and the UE by default.

In some embodiments, the predetermined resource mapping relationship is notified by the base station to the UE. For example, the base station uses a resource mapping indicator to indicate the predetermined resource mapping relationship. The base station sends the resource mapping indicator to the UE, and the UE receives the resource mapping indicator sent by the base station. The UE configures, based on the resource mapping relationship indicated by the resource mapping indicator, the time-frequency resources respectively occupied by the preamble sequence and the scrambled service data.

The base station notifies the UE of the resource mapping indicator in any one of the following manners, and notification manners include, but are not limited to, the following manners:
1. The base station notifies the UE of the resource mapping indicator by using a PBCH.
2. After a cell search process is completed, the base station notifies the UE of the resource mapping indicator by using SI of the cell.
3. For the UE in an RRC_CONNECTED state, an RRC_ACTIVE state, or an RRC_INACTIVE state, the base station notifies the specific UE of the resource mapping indicator by using a PDCCH or a dedicated channel.

In some embodiments, the predetermined resource mapping relationship includes a time domain resource mapping relationship and a frequency domain resource mapping relationship.

The time domain resource mapping relationship includes any one of the following (1) to (9). The preamble sequence and the scrambled service data use symbols in a same radio subframe, as described in (1) to (6). Alternatively, the preamble sequence and the scrambled service data may use symbols in different radio subframes, as described in (7) to (11). Such a manner is more applicable to a scenario in which there is a relatively large service data volume. In this embodiment of this application, symbols occupied by the preamble sequence and the scrambled service data are orthogonal frequency division multiplexing (English: Orthogonal Frequency Division Multiplexing, OFDM) symbols in a radio subframe except a cycle prefix (English: Cycle Prefix, CP). Whether the CP is added to the radio subframe and a length of the CP may be set based on an application requirement. Whether a GT (Guard Time) is added to the radio subframe and a length of the GT may be set based on an application requirement.

Figure 3A:
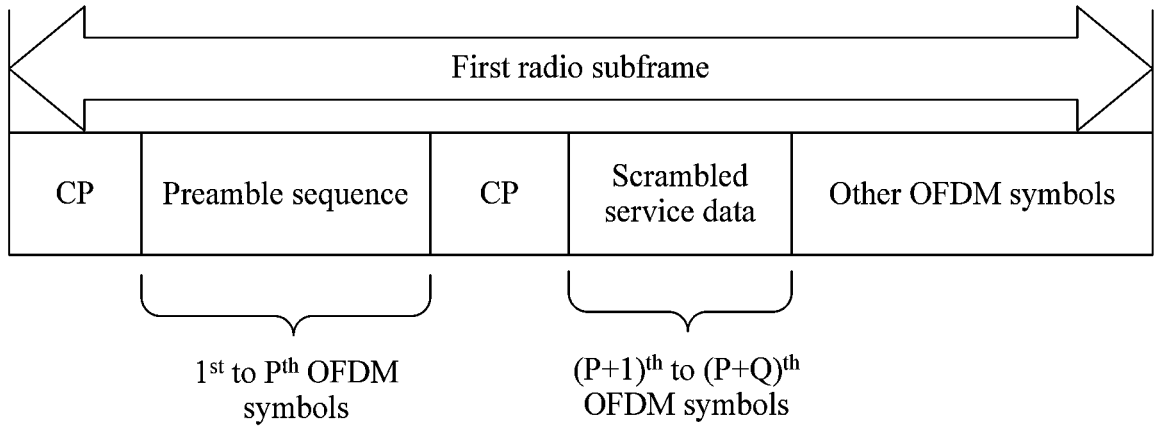
FIG. 3A is a first schematic diagram of a time domain resource mapping relationship according to an embodiment of this application.

(1) The preamble sequence occupies first P OFDM symbols in a first radio subframe, and the scrambled service data occupies $(P+1)^{th}$ to $(P+Q)^{th}$ OFDM symbols in the first radio subframe, where each of P and Q is a natural number greater than or equal to 1, and a sum of P+Q is less than a total quantity K of OFDM symbols in the first radio subframe, as shown in FIG. 3A.

Figure 3B:
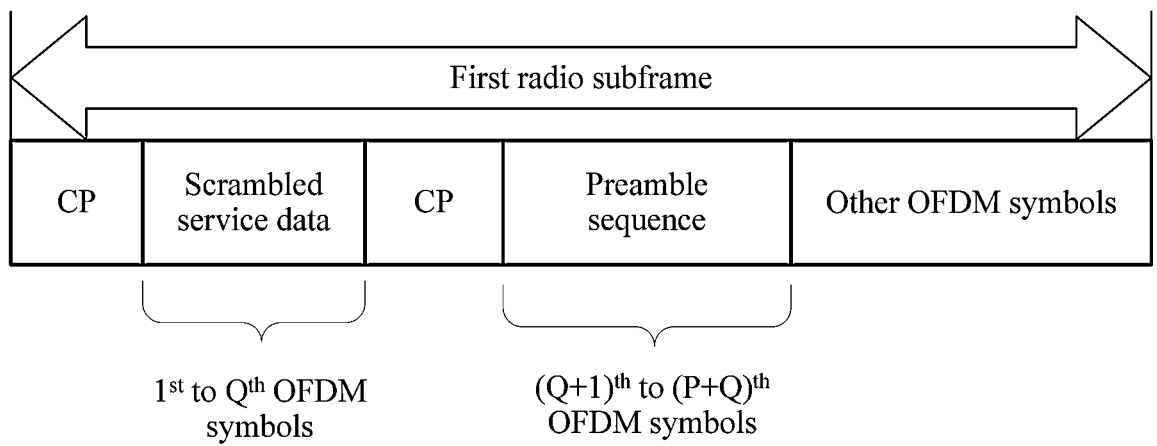
FIG. 3B is a second schematic diagram of a time domain resource mapping relationship according to an embodiment of this application.

(2) The scrambled service data occupies first Q OFDM symbols in a first radio subframe except CPs, and the preamble sequence occupies $(Q+1)^{th}$ to $(P+Q)^{th}$ OFDM symbols in the first radio subframe, as shown in FIG. 3B.

Figure 3C:
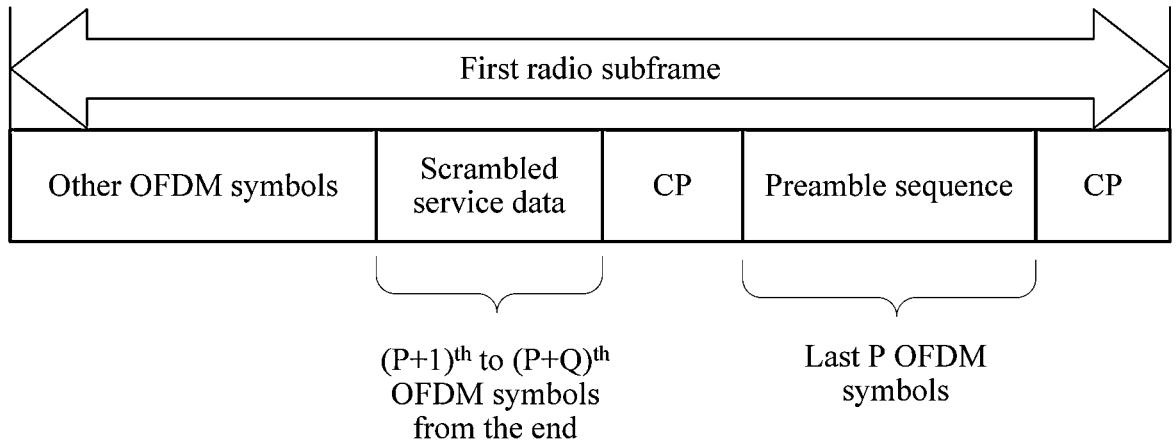
FIG. 3C is a third schematic diagram of a time domain resource mapping relationship according to an embodiment of this application.

(3) The preamble sequence occupies last P OFDM symbols in a first radio subframe, and the scrambled service data occupies $(P+1)^{th}$ to $(P+Q)^{th}$ OFDM symbols from the end in the first radio subframe, as shown in FIG. 3C.

Figure 3D:
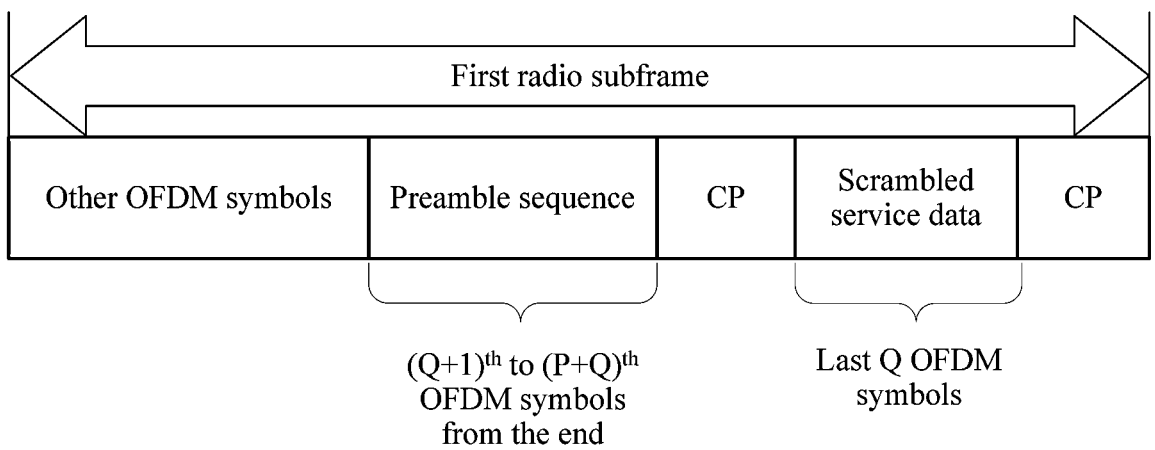
FIG. 3D is a fourth schematic diagram of a time domain resource mapping relationship according to an embodiment of this application.
Figure 3E:
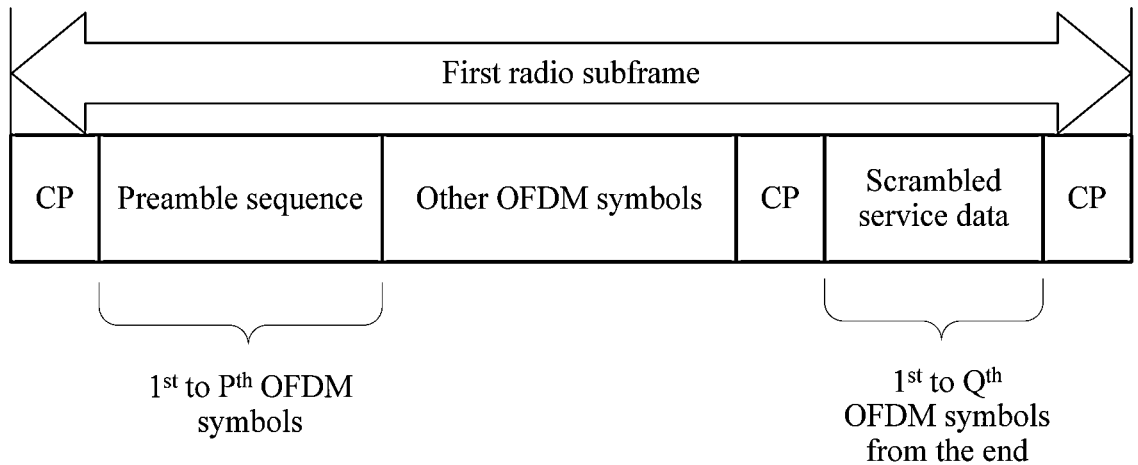
FIG. 3E is a fifth schematic diagram of a time domain resource mapping relationship according to an embodiment of this application.

(4) The scrambled service data occupies last Q OFDM symbols in a first radio subframe, and the preamble sequence occupies $(Q+1)^{th}$ to $(P+Q)^{th}$ OFDM symbols from the end in the first radio subframe, as shown in FIG. 3D (5) The preamble sequence occupies first P OFDM symbols in a first radio subframe, and the scrambled service data occupies last Q OFDM symbols in the first radio subframe, as shown in FIG. 3E.

Figure 3F:
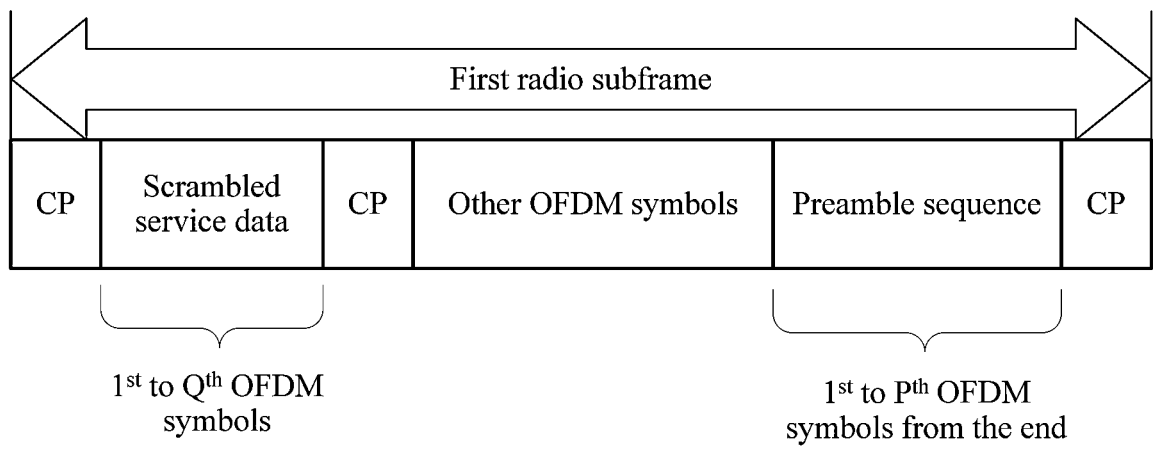
FIG. 3F is a sixth schematic diagram of a time domain resource mapping relationship according to an embodiment of this application.

(6) The scrambled service data occupies first Q OFDM symbols in a first radio subframe, and the preamble sequence occupies last P OFDM symbols in the first radio subframe, as shown in FIG. 3F.

Figure 3G:
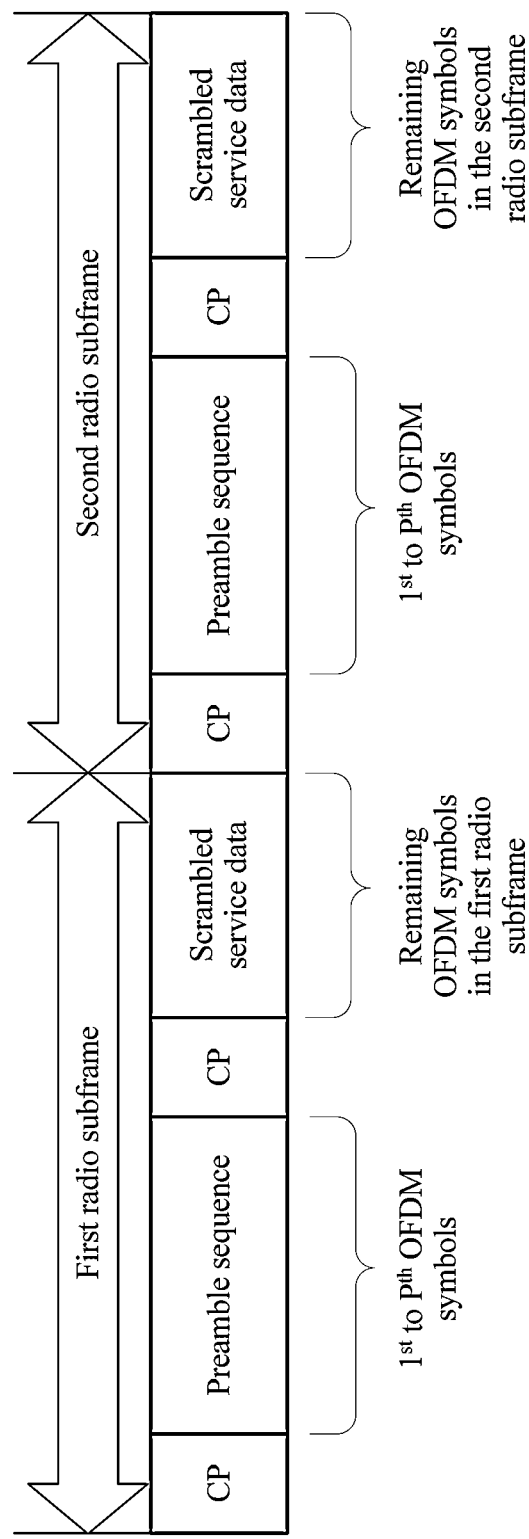
FIG. 3G is a seventh schematic diagram of a time domain resource mapping relationship according to an embodiment of this application.

(7) An MSG 1 lasts for a predetermined quantity of radio subframes. In each of these radio subframes, first P OFDM symbols are a preamble sequence, and scrambled service data occupies remaining OFDM symbols in each radio subframe. In other words, the preamble sequence appears in each of the radio subframes. The scrambled service data is carried in the symbols in each of the radio subframes except the preamble sequence. The quantity of the radio subframes may be designated in advance by using a protocol standard. In an example shown in FIG. 3G, the MSG 1 lasts for two radio subframes.

Figure 3H:
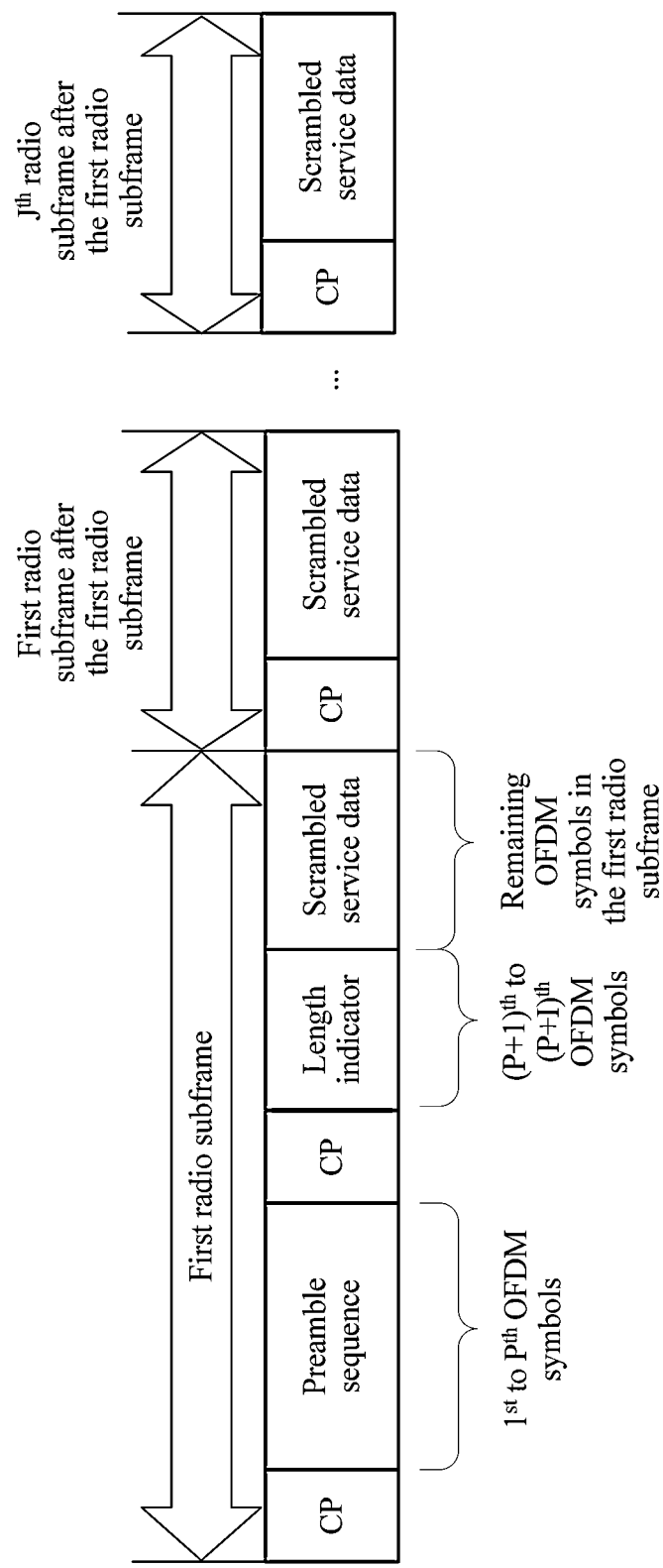
FIG. 3H is an eighth schematic diagram of a time domain resource mapping relationship according to an embodiment of this application.

(8) The preamble sequence occupies first P OFDM symbols in a first radio subframe, a length indicator NI occupies $(P+1)^{th}$ to $(P+I)^{th}$ OFDM symbols in the first radio subframe, the length indicator is used to indicate a quantity J of subframes occupied by the scrambled service data, and the scrambled service data occupies remaining OFDM symbols starting from a $(P+I+1)^{th}$ OFDM symbol in the first radio subframe and OFDM symbols in $1^{st}$ to $J^{th}$ adjacent radio subframes after the first radio subframe, where each of I and J is a natural number greater than or equal to 1, as shown in FIG. 3H.

Figure 3I:
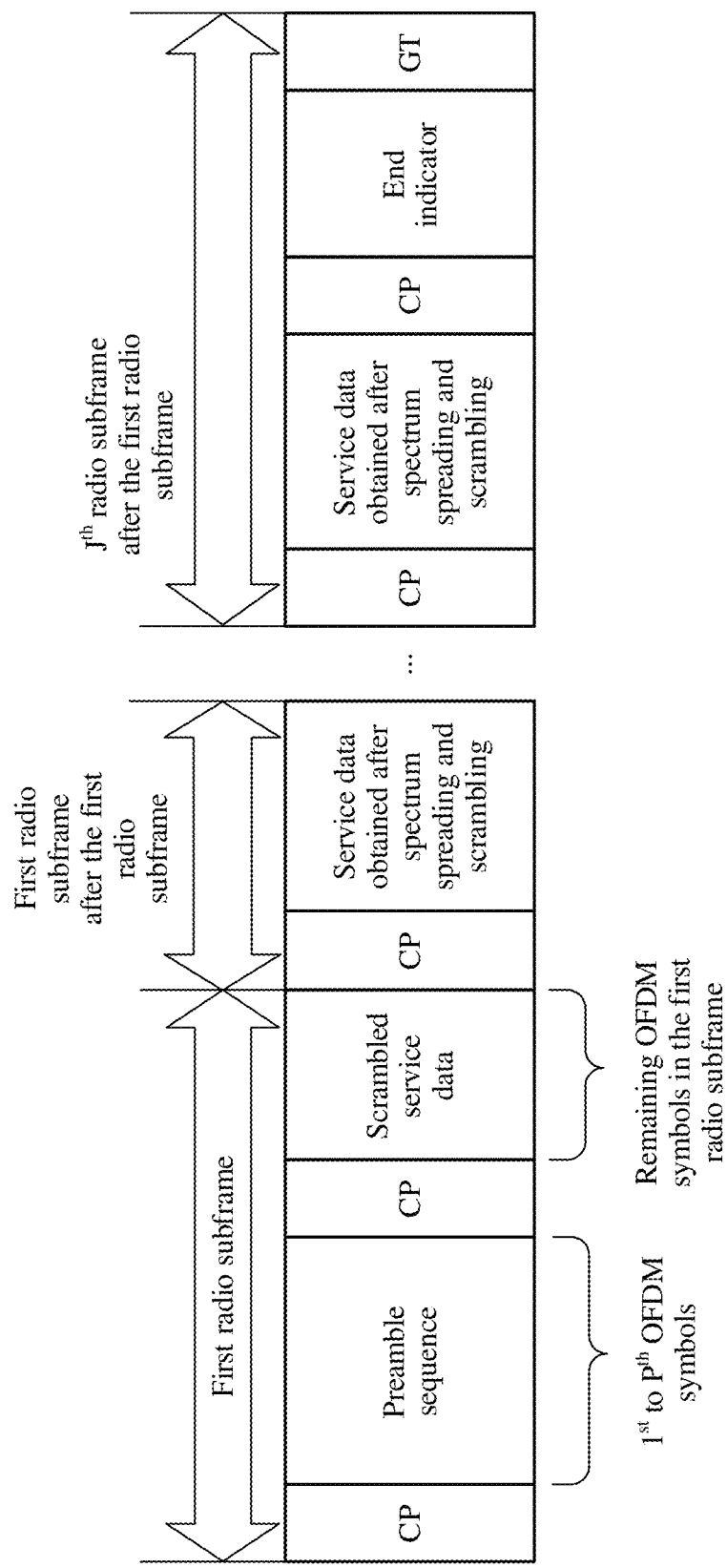
FIG. 3I is a ninth schematic diagram of a time domain resource mapping relationship according to an embodiment of this application.

(9) The preamble sequence occupies first P OFDM symbols in a first radio subframe, and the scrambled service data occupies remaining OFDM symbols starting from a $(P+1)^{th}$ OFDM symbol in the first radio subframe and OFDM symbols in $1^{st}$ to $J^{th}$ adjacent radio subframes after the first radio subframe, where an end indicator occupies last L OFDM symbols in the $J^{th}$ radio subframe, and the end indicator is used to indicate that transmission of the scrambled service data is completed. The end indicator may be a preamble sequence, or may be another sequence having a mapping relationship with a preamble sequence, provided that both the UE and the base station can recognize the end indicator, as shown in FIG. 3I.

The frequency domain resource mapping relationship includes either of the following (1) and (2).

Figure 3J:
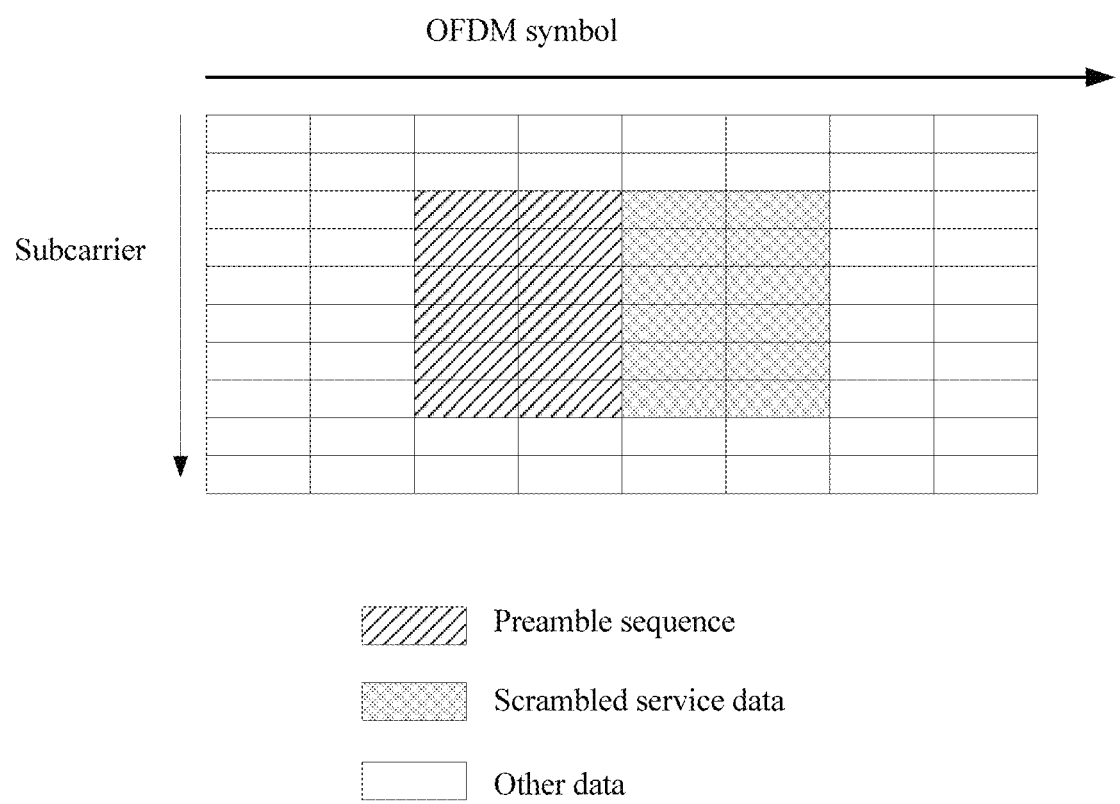
FIG. 3J is a first schematic diagram of a first frequency domain resource mapping relationship according to an embodiment of this application.
Figure 3K:
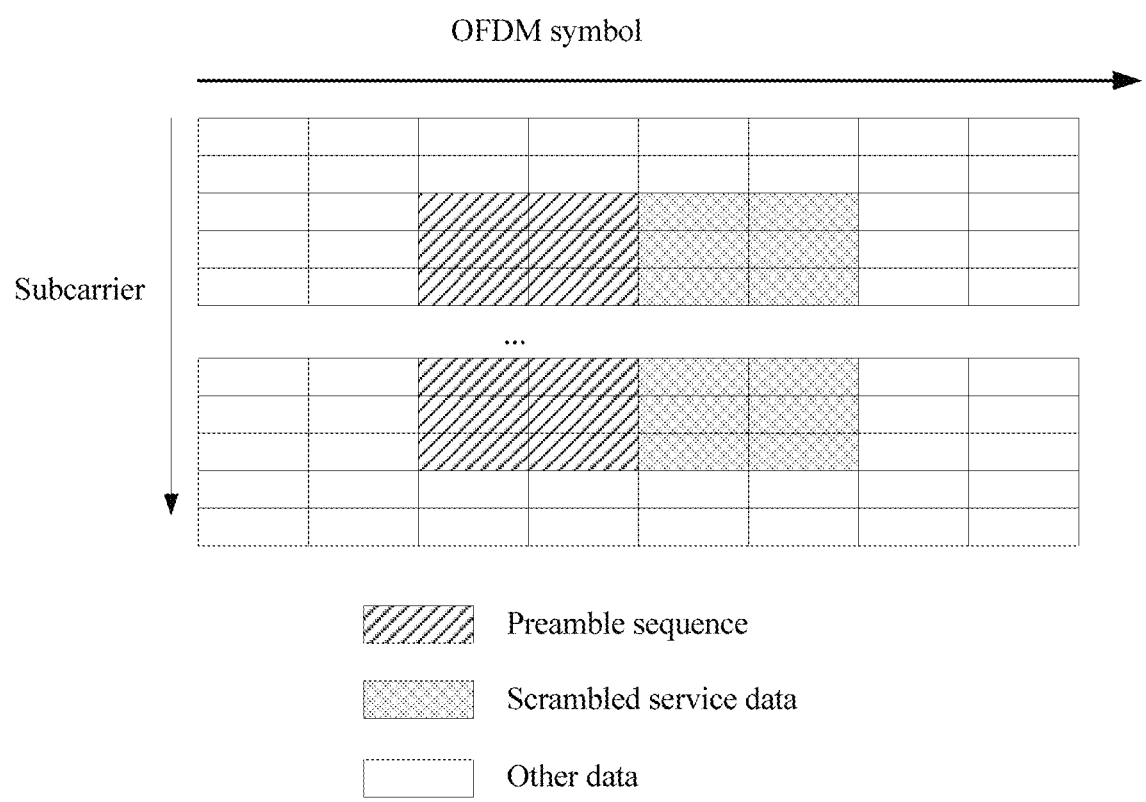
FIG. 3K is a first schematic diagram of a first frequency domain resource mapping relationship according to an embodiment of this application.

(1) The preamble sequence and the scrambled service data use different symbols in a same subcarrier. That is, the preamble sequence and the scrambled service data respectively occupy different symbols symbols in a first subcarrier, and the first subcarrier includes X subcarriers, where X is a natural number greater than or equal to 1. The first subcarrier herein may be one subcarrier, may be a plurality of consecutive subcarriers, or may be a plurality of inconsecutive subcarriers, as shown in FIG. 3J and FIG. 3K.

Figure 3L:
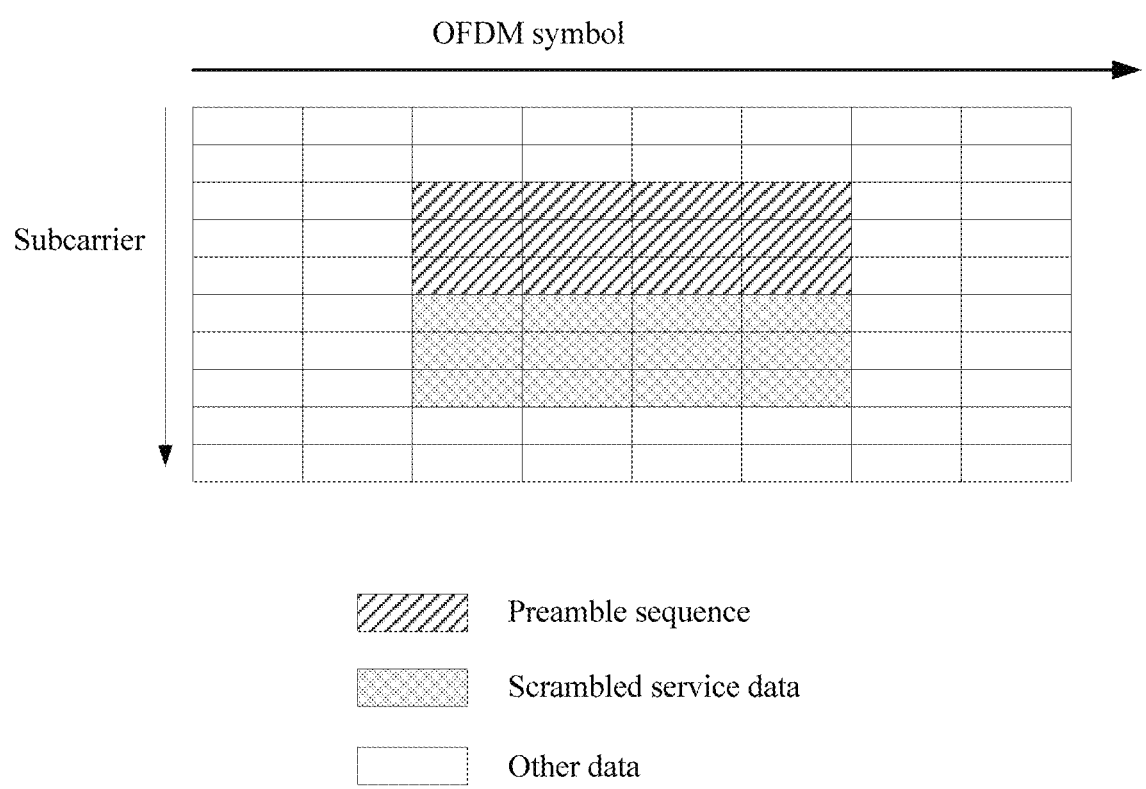
FIG. 3L is a second schematic diagram of a first frequency domain resource mapping relationship according to an embodiment of this application.
Figure 3M:
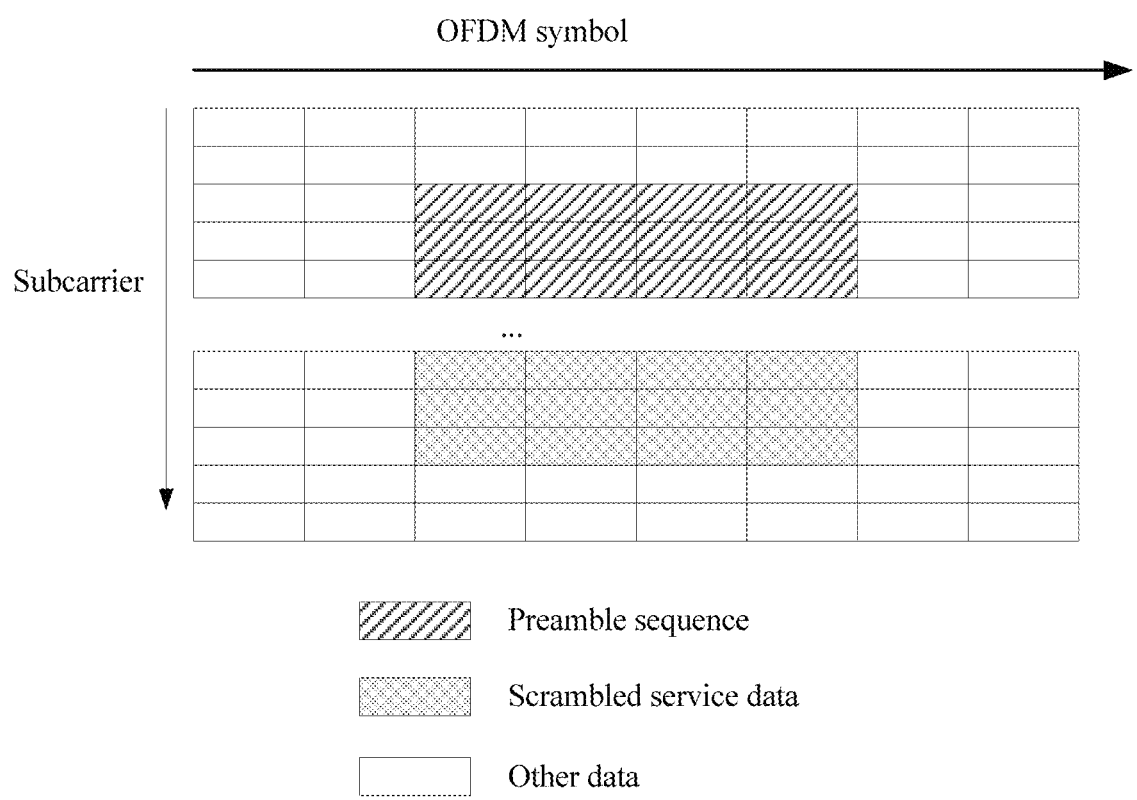
FIG. 3M is a second schematic diagram of a first frequency domain resource mapping relationship according to an embodiment of this application.
Figure 3N:
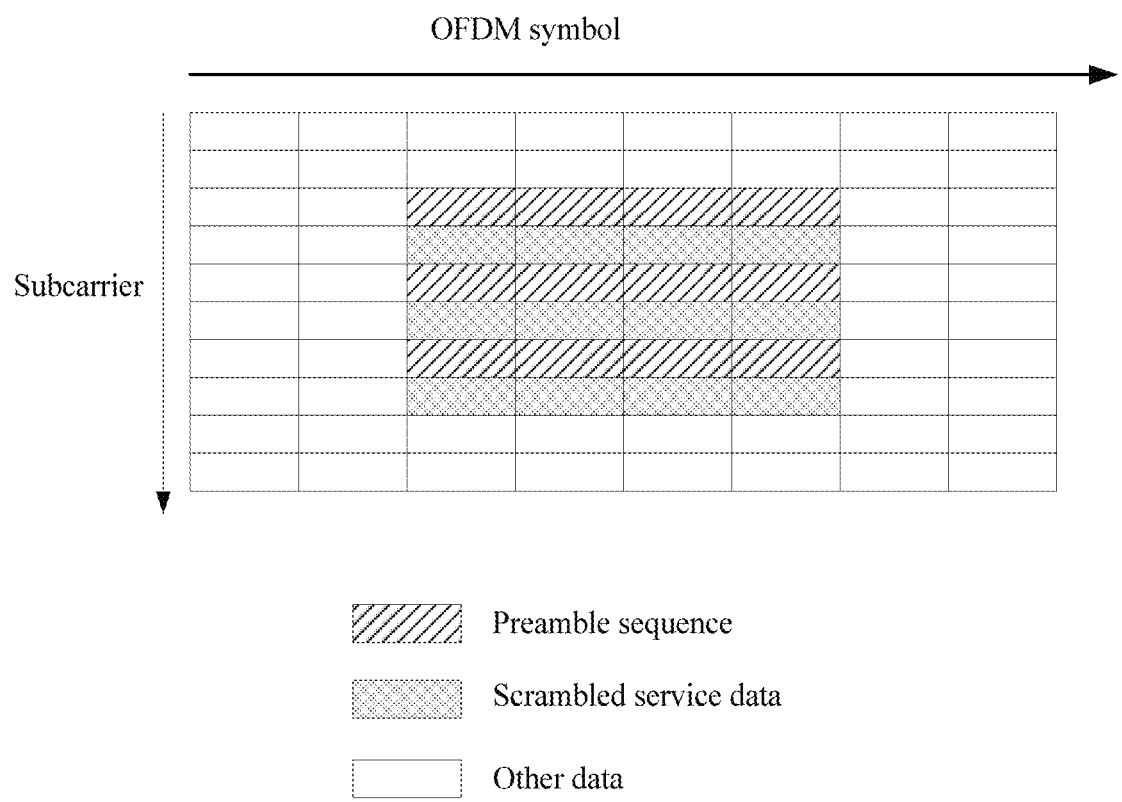
FIG. 3N is a second schematic diagram of a first frequency domain resource mapping relationship according to an embodiment of this application.
Figure 3O:
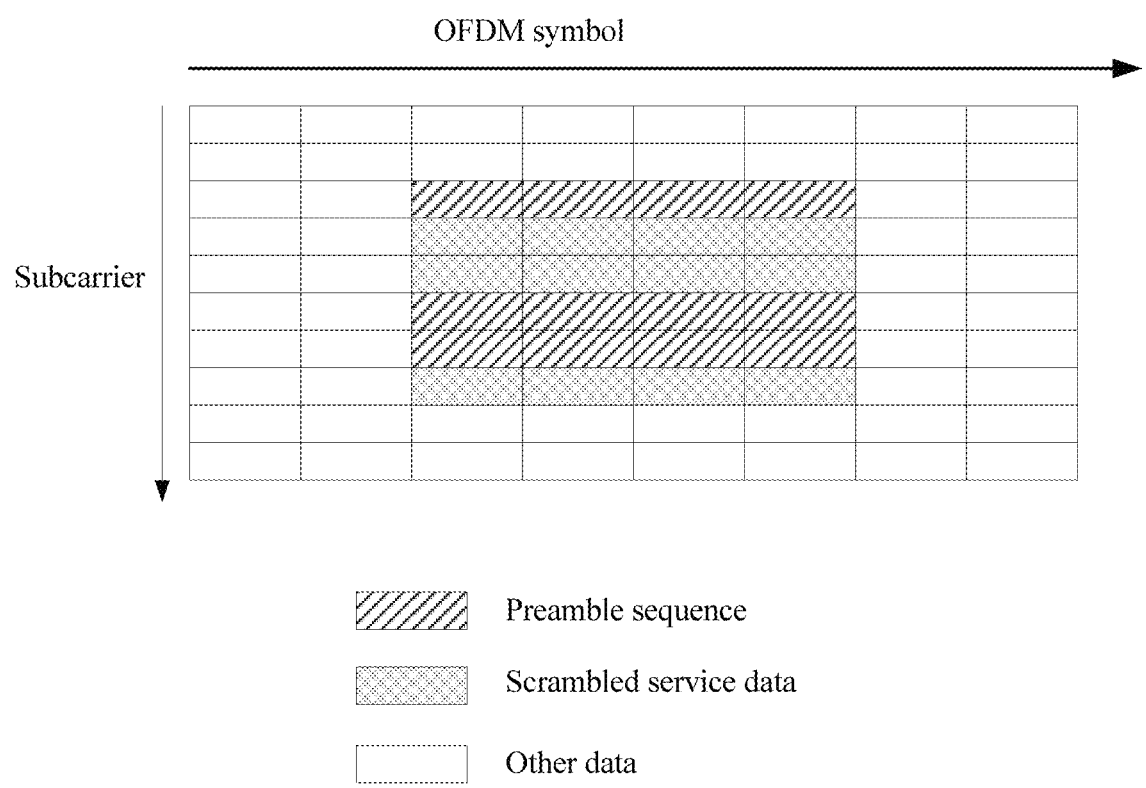
FIG. 3O is a second schematic diagram of a first frequency domain resource mapping relationship according to an embodiment of this application.

(2) The preamble sequence and the scrambled service data use different symbols in different subcarriers. That is, the preamble sequence occupies symbols in a first subcarrier, the scrambled service data occupies symbols in the first subcarrier, the first subcarrier includes X subcarriers, and the second subcarrier includes Y subcarriers, where each of X and Y is a natural number greater than 1. The first subcarrier and the second subcarrier may be consecutive subcarriers, as shown in FIG. 3L. Alternatively, the first subcarrier and the second subcarrier may be inconsecutive subcarriers, as shown in FIG. 3M. Alternatively, the first subcarrier and the second subcarrier may be evenly spaced subcarriers, as shown in FIG. 3N. Alternatively, the first subcarrier and the second subcarrier may be unevenly spaced subcarriers, as shown in FIG. 3O.

The resource mapping relationship may be determined by combining any one of the time domain resource mapping relationships and any one of the frequency domain resource mapping relationships. For example, a resource mapping relationship determined by combining the first time domain resource mapping relationship and the first frequency domain resource mapping relationship is that the preamble sequence and the scrambled service data use symbols in the same radio subframe in the same subcarrier, the preamble sequence occupies the first P OFDM symbols in the radio subframe, and the scrambled service data occupies the $(P+1)^{th}$ to $(P+Q)^{th}$ OFDM symbols in the first radio subframe. Other combinations are not listed one by one.

Step 26: The UE sends, on the configured time-frequency resources, the preamble sequence and the scrambled service data to the base station to which the cell belongs.

Step 27: The UE receives a random access response sent by the base station based on the preamble sequence.

It should be noted herein that the base station may notify the UE of the scrambling code mapping indication and the resource mapping indicator in a same manner, or may notify the UE of the scrambling code mapping indication and the resource mapping indicator in different manners. For example, the base station may notify the UE of the scrambling code mapping indication and the resource mapping indicator by using different time-frequency resources on the physical broadcast channel. Alternatively, the base station may notify the UE of the scrambling code mapping indication by using the physical broadcast channel, and may notify the UE of the resource mapping indicator by using the SI.

Figure 4:
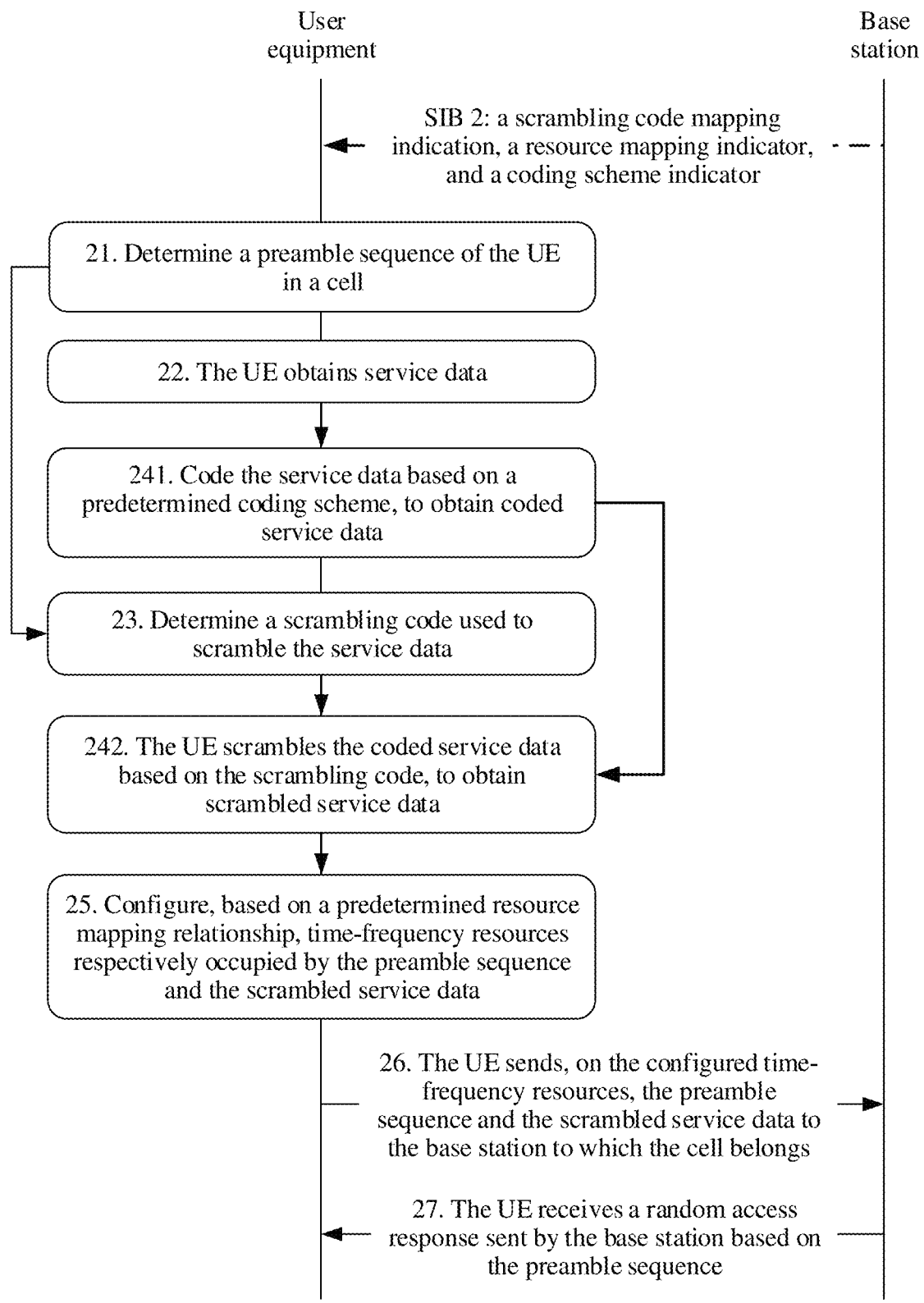
FIG. 4 is another flowchart of a random access method according to an embodiment of this application.

In some embodiments, to increase efficiency of coding the service data and improve decoding accuracy of the base station, the service data may be further coded based on a predetermined coding scheme before the service data is scrambled based on the scrambling code. Then coded service data is scrambled. The coding further helps distinguish between different types of service data. A flowchart of such a random access method is shown in FIG. 4. Steps 21 to 23 and step 25 are similar to the corresponding steps in FIG. 2. For implementation steps, refer to the descriptions in the corresponding steps in FIG. 2. Details are not repeated herein again.

Step 21: After obtaining downlink synchronization with a cell, UE determines a preamble sequence of the UE in the cell.

Step 22: The UE obtains service data.

Step 23: The UE determines a scrambling code used to scramble the service data.

After obtaining the service data, the UE performs step 241.

Step 241: The UE codes the service data based on a predetermined coding scheme, to obtain coded service data.

In some embodiments, the predetermined coding scheme is learned in advance by the UE and a base station to which the cell belongs.

In some embodiments, the predetermined coding scheme is configured on a base station and the UE by default.

In some embodiments, the predetermined coding scheme is notified by a base station to the UE by using a coding scheme indicator, and the coding scheme indicator is used to indicate the predetermined coding scheme. The coding scheme includes, but is not limited to, a Turbo code or a polar code. For example, a first coding scheme indicator indicates the Turbo code, a second coding scheme indicator indicates the polar code, and a third coding scheme indicator indicates a low-density parity-check code (English: Low Density Parity Check Code, LDPC).

It should be noted that there is no need to limit an order of performing step 23 and step 241. After step 23 and step 241 are performed, step 242 is performed.

Step 242: The UE scrambles the coded service data in step 241 based on the scrambling code determined in step 23, to obtain scrambled service data.

Step 25: The UE configures, based on a predetermined resource mapping relationship, time-frequency resources respectively occupied by the preamble sequence and the scrambled service data obtained in step 242.

Step 26: The UE sends, on the configured time-frequency resources, the preamble sequence and the scrambled service data to the base station to which the cell belongs.

Step 27: The UE receives a random access response sent by the base station based on the preamble sequence.

It should be noted herein that the base station may notify the UE of a scrambling code mapping indication, a resource mapping indicator, and the coding scheme indicator in a same manner, or may notify the UE of a scrambling code mapping indication, a resource mapping indicator, and the coding scheme indicator in different manners. Alternatively, the base station may notify the UE of a scrambling code mapping indication, a resource mapping indicator, and the coding scheme indicator by using different time-frequency resources in SI, for example, notify the UE of a scrambling code mapping indication, a resource mapping indicator, and the coding scheme indicator by using different symbols in an SIB 2. Alternatively, the base station may notify the UE of a scrambling code mapping indication and a resource mapping indicator by using a physical broadcast channel, and may notify the UE of the coding scheme indicator by using SI.

In some embodiments, for some services that require the base station to provide corresponding response data based on service data sent by the UE, such as an Internet of things service or an Internet of vehicles service, the base station needs to deliver response data including a control instruction to the UE based on service data that includes measurement parameter values in aspects of a current location, an environment, and the like and that is reported by the UE. This application provides two manners in which the base station delivers the response data to the UE. In this application, the two response manners are respectively described in detail with reference to FIG. 5 and FIG. 6.

Figure 5:
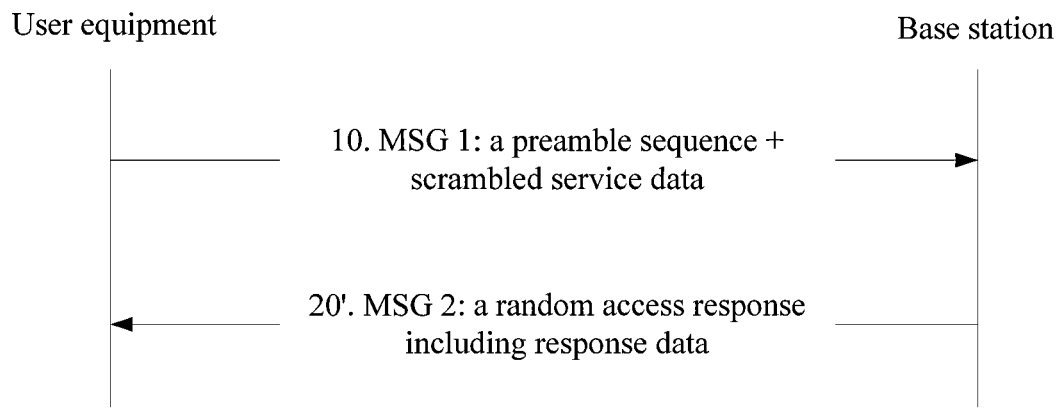
FIG. 5 is another flowchart of a random access method according to an embodiment of this application.

FIG. 5 is a flowchart of a random access method according to an embodiment of this application. After generating corresponding response data based on service data in an MSG 1, a base station sends the response data to UE by using an MSG 2. The method includes the following steps:

Step 10: The UE sends the MSG 1 to the base station to which a cell belongs. The MSG 1 includes both a preamble sequence and scrambled service data. This step is similar to step 10 in FIG. 1. For a specific process in which the UE generates the MSG 1, refer to FIG. 2, FIG. 3, FIG. 4, and the descriptions about FIG. 2, FIG. 3, and FIG. 4. Details are not described herein again.

Step 20': The UE receives the MSG 2 sent by the base station, where the MSG 2 is a random access response. The random access response further includes the response data, and the response data is generated by the base station based on the service data. The base station may send the response data in a plurality of manners by using the MSG 2. For example, the base station adds the response data to a padding field; or redefines field content of an existing random access response, and adds the response data to some existing fields in the random access response, such as a UL-Grant field and a temporary C-RNTI field.

For a service that has a relatively small service data volume, or a service for which a procedure in which the base station generates response data based on service data is relatively simple and consumes a relatively short time, the base station may send the response data to the UE by using the MSG 2. On one hand, this makes little impact on an existing random access process, and does not greatly prolong a time for completing the random access process. On the other hand, the UE may obtain the service after receiving the MSG 2, thereby greatly reducing a service delay, and improving service timeliness.

Figure 6:
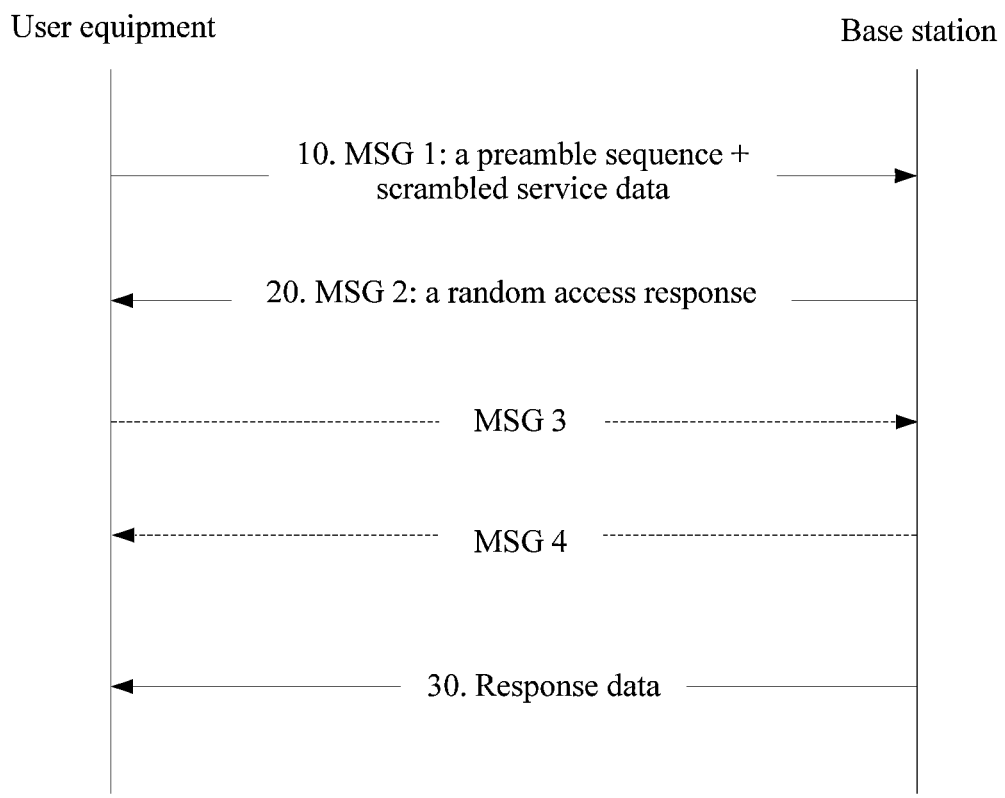
FIG. 6 is another flowchart of a random access method according to an embodiment of this application.

FIG. 6 is a flowchart of another random access method according to this application. After a random access process is completed, the UE receives response data sent by a base station. The method includes the following steps:

Step 10: The UE sends an MSG 1 to the base station to which a cell belongs. The MSG 1 includes both a preamble sequence and scrambled service data. This step is similar to step 10 in FIG. 1. For a specific process in which the UE generates the MSG 1, refer to FIG. 2, FIG. 3, FIG. 4, and the descriptions about FIG. 2, FIG. 3, and FIG. 4. Details are not described herein again.

Step 20: The UE receives an MSG 2 sent by the base station, where the MSG 2 is a random access response. This step is similar to step 20 in FIG. 1. Details are not described herein again.

Step 30: The UE receives the response data sent by the base station after the random access process is completed.

For a service that has a relatively small service data volume, or a service for which a procedure in which the base station generates response data based on service data is relatively complex and consumes a relatively long time, the base station may send the response data to the UE by using a downlink channel after the random access process is completed. Optionally, the downlink channel is a physical downlink shared channel (English: Physical Downlink Shared Channel, PDSCH), a physical downlink control channel (English: Physical Downlink Control Channel, PDCCH), or the like.

In an existing random access solution, the UE needs to send service data to the base station after random access is completed, and then waits to receive response data sent by the base station. In the random access solution provided in this embodiment, the UE already sends the service data to the base station by using the MSG 1. Therefore, the UE does not need to send the service data after random access is completed. After the random access process is completed, the UE may directly receive the response data. Compared with the existing random access solution, the random access method provided in this embodiment can reduce a time used by the UE to obtain a service, thereby improving timeliness of the service.

Figure 7:
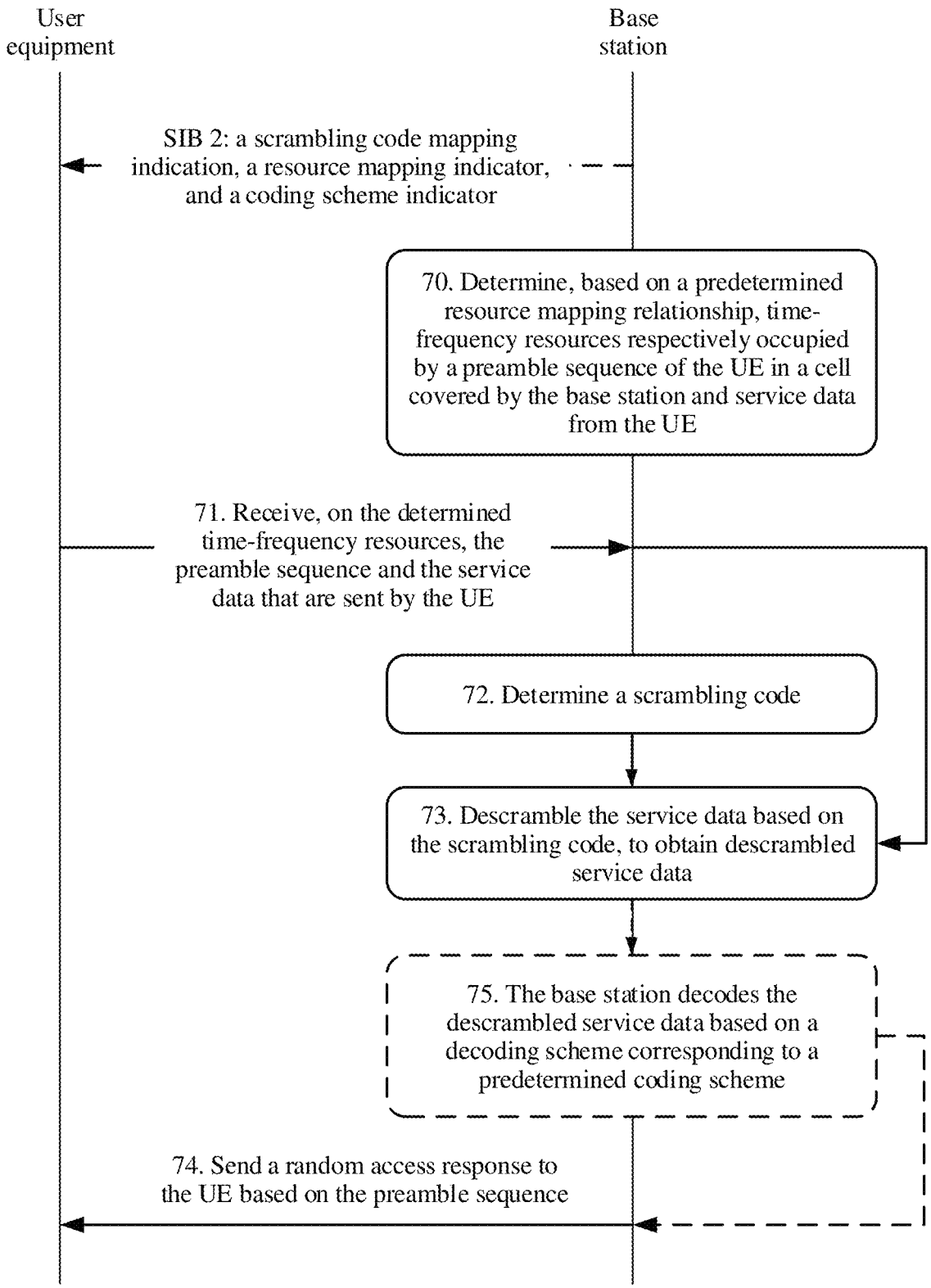
FIG. 7 is another flowchart of a random access method according to an embodiment of this application.

FIG. 7 is a schematic diagram of a random access method according to this application. Implementation details of the random access method are emphasized in FIG. 7 from a perspective of a base station.

Step 70: The base station determines, based on a predetermined resource mapping relationship, time-frequency resources respectively occupied by a preamble sequence and service data that are in a cell covered by the base station.

A quantity of preamble sequences that can be used by each cell is limited. For example, in an LTE network, each cell has 64 preamble sequences that can be used. The preamble sequence is sent on a physical random access channel (English: Physical Random Access Channel, PRACH). The base station notifies, by using broadcast system information SIB 2, all UEs of specific time-frequency resources on which sending preamble sequences is allowed.

The base station may determine, based on the predetermined resource mapping relationship and a time-frequency resource occupied by each preamble sequence, a time-frequency resource occupied by the corresponding service data.

In some embodiments, the predetermined resource mapping relationship is learned by the base station and the UE in advance before the UE sends the preamble sequence and the service data.

In some embodiments, the predetermined resource mapping relationship is configured on the base station and the UE by default.

In some embodiments, the predetermined resource mapping relationship is notified by the base station to the UE. For example, the base station uses a resource mapping indicator to indicate the predetermined resource mapping relationship. The base station sends the resource mapping indicator to the UE, and the UE receives the resource mapping indicator sent by the base station. The UE configures, based on the resource mapping relationship indicated by the resource mapping indicator, the time-frequency resources respectively occupied by the preamble sequence and the scrambled service data. For details about the resource mapping relationship, refer to the descriptions in the foregoing embodiment. Details are not described herein again.

Step 71: The base station receives, on the determined time-frequency resources, the preamble sequence and the service data that are sent by the UE, where the UE has obtained downlink synchronization with the cell, but has not obtained uplink synchronization with the cell.

Step 72: The base station determines a scrambling code, where the scrambling code is in a one-to-one correspondence with the received preamble sequence, or the scrambling code is in a one-to-one correspondence with an identifier of the UE, or the scrambling code is in a one-to-one correspondence with a combination of the received preamble sequence and an identifier of the UE.

In some embodiments, the scrambling code is in a one-to-one correspondence with the preamble sequence sent by the UE. In this case, an RRC state of the UE is not limited. Alternatively, when the UE is in an RRC_CONNECTED state or an RRC_INACTIVE state, the scrambling code is in a one-to-one correspondence with the identifier of the UE. Alternatively, the scrambling code is in a one-to-one correspondence with the combination of the preamble sequence sent by the UE and the identifier of the UE. Optionally, a manner of determining the scrambling code is learned in advance by the UE and the base station to which the cell belongs. The base station determines a corresponding scrambling code based on the preamble sequence and/or the identifier of the UE in an RRC_CONNECTED state or an RRC_INACTIVE state in a known manner of determining the scrambling code. Optionally, the manner of determining the scrambling code is configured on the base station and the UE by default. Optionally, the manner of determining the scrambling code is notified by the base station to the UE by using a scrambling code mapping indication.

For the manner of determining the scrambling code and details about each of the three correspondences, refer to the descriptions in the foregoing embodiment. Details are not described herein again.

Step 73: The base station descrambles the received service data based on the scrambling code, to obtain descrambled service data.

Descrambling (Descrambling) is reverse processing of scrambling, that is, decrypting, by using a scrambling code, a signal carrying service data. After obtaining the descrambled service data, the base station may provide a corresponding service for a user based on the service data.

Step 74: The base station sends a random access response to the UE based on the preamble sequence.

In the random access method provided in this embodiment, when the base station receives an MSG 1, the base station receives, on the time-frequency resources having a mapping relationship, the preamble sequence and the service data that are sent by the UE. In other words, the MSG 1 carries both the preamble and the service data. Therefore, the base station does not need to provide a service for the UE after waiting for completion of a random access process, thereby reducing a service delay.

In some embodiments, before the base station receives the preamble sequence and the service data from the UE in step 71, the method shown in FIG. 7 further includes: sending, by the base station, a resource mapping indicator to the UE, where the resource mapping indicator is used to indicate the predetermined resource mapping relationship.

In some embodiments, before the base station receives the preamble sequence and the service data from the UE in step 71, the method shown in FIG. 7 further includes: sending, by the base station, a scrambling code mapping indication to the UE. Specifically, a first scrambling code mapping indication is used to indicate a mapping mode of a preamble sequence and a scrambling code, a second scrambling code mapping indication is used to indicate a mapping mode of a preamble sequence and an identifier of the UE, and a third scrambling code mapping indication is used to indicate a mapping mode of a preamble sequence and a combination of the preamble sequence and an identifier of the UE.

For a manner in which the base station sends the resource mapping indicator or the scrambling code mapping indication to the UE, refer to the descriptions in the foregoing embodiment. Details are not described herein again.

In some embodiments, for some services that require the base station to provide corresponding response data based on service data sent by the UE, this application provides two manners in which the base station delivers the response data to the UE. Optionally, the base station may add the response data to the random access response and send the random access response to the UE, or may send the response data to the UE after the random access process is completed. For specific sending manners, refer to the descriptions in the foregoing embodiment. Details are not described herein again. The two manners of sending the response data may be selected based on a data volume of the service data and a processing time and a processing difficulty of the service data.

In some embodiments, to improve data transmission reliability, before the scrambling, the UE may code the service data. Correspondingly, after performing the descrambling, the base station further needs to perform corresponding decoding. As shown in FIG. 7, the random access method further includes the following step:

Step 75: The base station decodes the descrambled service data based on a decoding scheme corresponding to a predetermined coding scheme.

In some embodiments, the predetermined coding scheme is learned in advance by the UE and the base station to which the cell belongs.

In some embodiments, the predetermined coding scheme is configured on the base station and the UE by default.

In some embodiments, the predetermined coding scheme is notified by the base station to the UE by using a coding scheme indicator, and the coding scheme indicator is used to indicate the predetermined coding scheme. Before the base station receives the preamble sequence and the service data that are sent by the UE, the method further includes: sending, by the base station, a coding scheme indicator to the UE, where the coding scheme indicator is used to indicate the predetermined coding scheme. For a manner in which the base station sends the coding scheme indicator, refer to the descriptions in the foregoing embodiment. Details are not described herein again.

It should be noted that when the UE codes the service data, the base station needs to decode the descrambled service data, and then generates the response data based on the decoded service data after obtaining the decoded service data.

Figure 8:
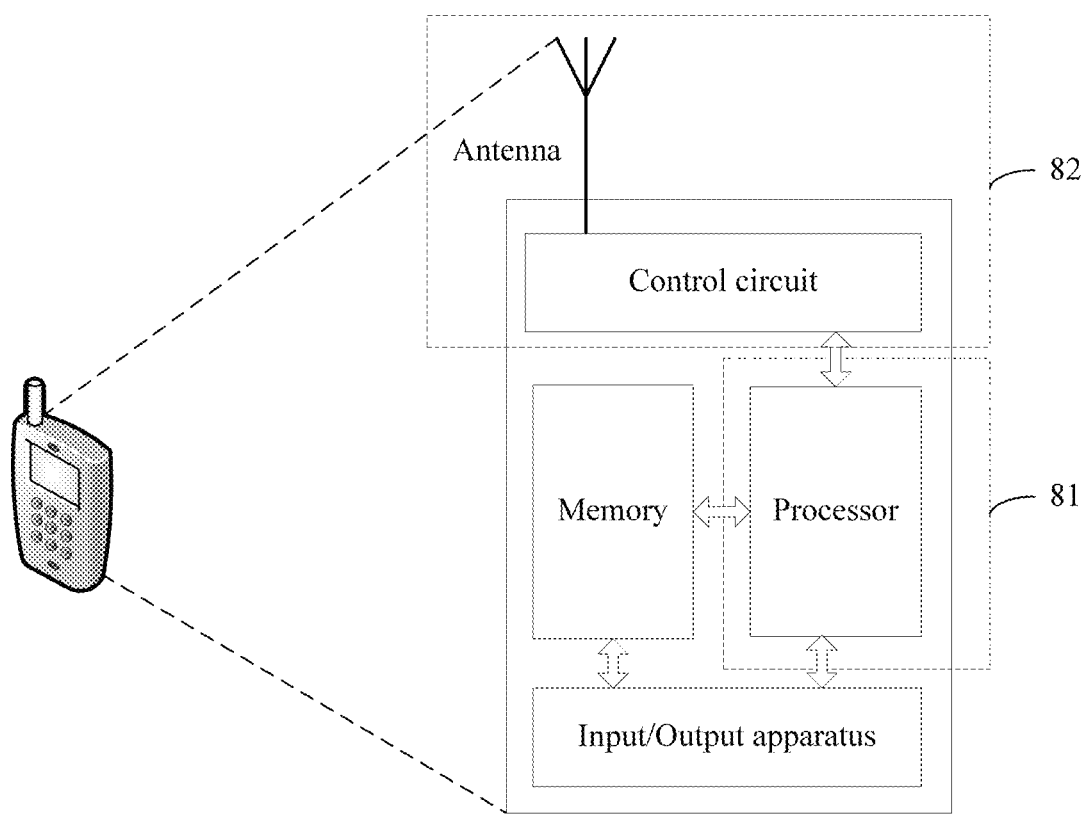
FIG. 8 is a schematic structural diagram of UE according to an embodiment of this application.

FIG. 8 is a schematic structural diagram of UE according to one embodiment. The UE may complete the functions of the UE in the procedures shown in FIG. 1, FIG. 2, FIG. 3, and FIG. 4. For ease of description, FIG. 8 shows only main components of the UE. As shown in FIG. 8, the UE includes a processor 81, a memory, a control circuit, an antenna, and an input/output apparatus. The processor is mainly configured to: process a communications protocol and communication data, control the entire user equipment, execute a software program, and process data of the software program, for example, configured to support the UE in performing some of the described actions in the procedures shown in FIG. 1, FIG. 2, and FIG. 4. The memory is mainly configured to store the software program and the data. The control circuit is mainly configured to perform conversion between a baseband signal and a radio frequency signal and process the radio frequency signal. The control circuit and the antenna may be referred to as a transceiver 82 that is mainly configured to receive and send a radio frequency signal in a form of an electromagnetic wave, for example, send an MSG 1 to a base station, and receive an MSG 2 sent by the base station.

After the user equipment is powered on, the processor 81 may read the software program in the memory, interpret and execute an instruction in the software program, and process the data of the software program.

The processor 81 is configured to: after the UE obtains downlink synchronization with a cell, determine a preamble sequence of the UE in the cell, where the UE has not obtained uplink synchronization with the cell; obtain service data; determine a scrambling code, where the scrambling code is in a one-to-one correspondence with the preamble sequence, or the scrambling code is in a one-to-one correspondence with an identifier of the UE, or the scrambling code is in a one-to-one correspondence with a combination of the preamble sequence and an identifier of the UE; and scramble the service data based on the scrambling code, to obtain scrambled service data; and configure, based on a predetermined resource mapping relationship, time-frequency resources respectively occupied by the preamble sequence and the scrambled service data.

The transceiver 82 is configured to: send, on the time-frequency resources configured by the processor 81, the preamble sequence and the scrambled service data to the base station to which the cell belongs; and receive a random access response sent by the base station based on the preamble sequence.

When the UE provided in this embodiment of this application sends an MSG 1, the UE sends the preamble sequence and the service data to the base station on the configured time-frequency resources. In other words, the MSG 1 carries both the preamble and the service data. In this way, the base station may obtain the service data from the received MSG 1 in time, to provide a service for the UE. Therefore, the base station does not need to wait for completion of a random access process before obtaining service data that is transmitted by the UE by using an extra time-frequency resource, thereby reducing a service delay.

In some embodiments, the scrambling code is in a one-to-one correspondence with the preamble sequence, and the transceiver 82 is further configured to receive a first scrambling code mapping indication sent by the base station, where the first scrambling code mapping indication is used to indicate a mapping mode of a preamble sequence and a scrambling code. The processor 81 is further configured to determine the scrambling code in a one-to-one correspondence with the preamble sequence based on the mapping mode and the preamble sequence.

In some embodiments, the scrambling code is in a one-to-one correspondence with the identifier of the UE, and the transceiver 82 is further configured to receive a second scrambling code mapping indication sent by the base station, where the second scrambling code mapping indication is used to indicate a mapping mode of a preamble sequence and an identifier of the UE; and the processor 81 is further configured to determine the scrambling code in a one-to-one correspondence with the identifier of the UE based on the mapping mode and the identifier of the UE.

In some embodiments, the scrambling code is in a one-to-one correspondence with the combination of the preamble sequence and the identifier of the UE, and the transceiver 82 is further configured to receive a third scrambling code mapping indication sent by the base station to which the cell belongs, where the third scrambling code mapping indication is used to indicate a mapping mode of a preamble sequence and a combination of the preamble sequence and an identifier of the UE; and the processor 81 is further configured to determine the scrambling code in a one-to-one correspondence with the combination of the preamble sequence and the identifier of the UE based on the mapping mode and the combination of the preamble sequence and the identifier of the UE.

In some embodiments, the transceiver 82 is further configured to receive a resource mapping indicator sent by the base station, where the resource mapping indicator is used to indicate the predetermined resource mapping relationship; and the processor 81 is further configured to configure, based on the resource mapping relationship indicated by the resource mapping indicator, the time-frequency resources respectively occupied by the preamble sequence and the scrambled service data.

In some embodiments, the transceiver 82 is further configured to receive a coding scheme indicator sent by the base station, where the coding scheme indicator is used to indicate a predetermined coding scheme.

For manners of sending the scrambling code mapping indications, the resource mapping indicator, and the coding scheme indicator, and more implementation details, refer to the descriptions in the foregoing method embodiment. Details are not described herein again.

Figure 9:
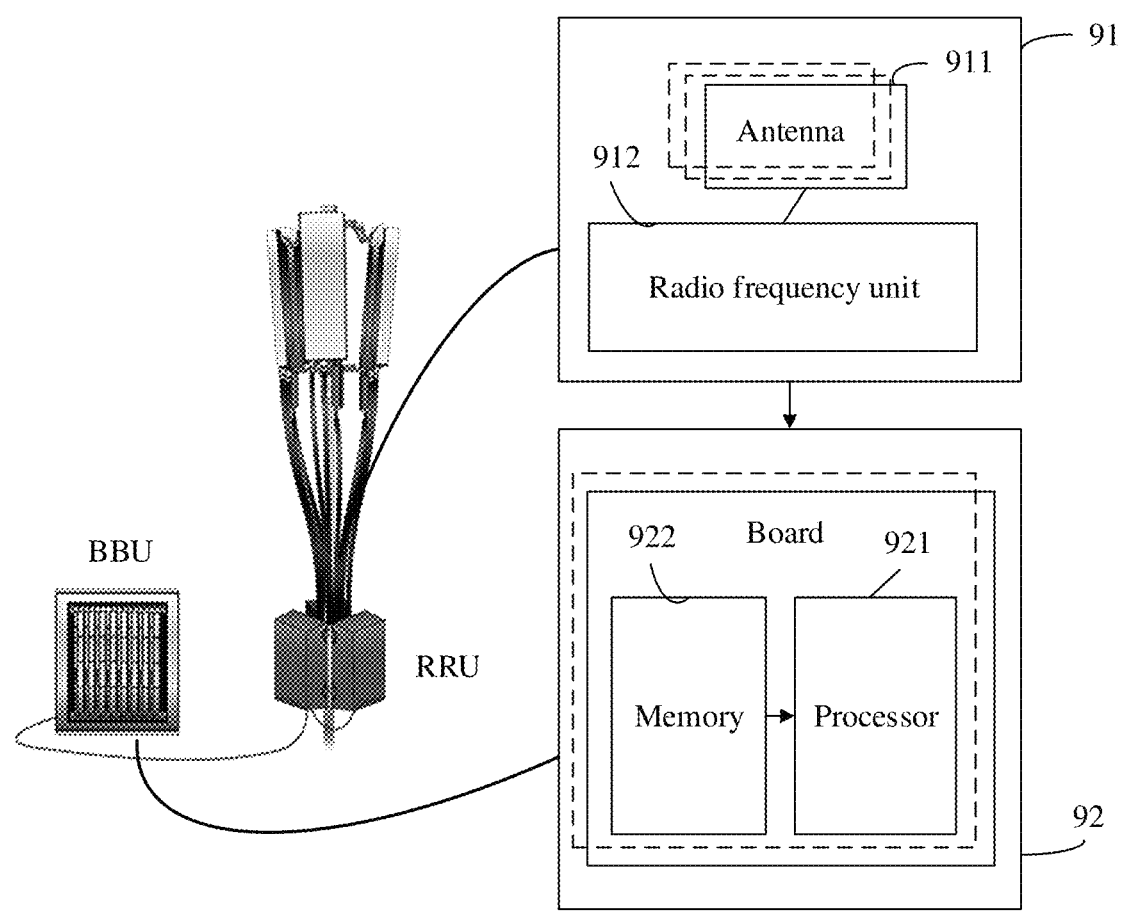
FIG. 9 is a schematic structural diagram of a base station according to an embodiment of this application.

FIG. 9 is a schematic structural diagram of a base station according to an embodiment of this application. The base station device may be used as the base station in FIG. 1, FIG. 2, FIG. 4, and FIG. 5. As shown in FIG. 9, the base station device includes one or more transceivers 91 and one or more baseband units (English: baseband unit, BBU for short) 92. The transceiver 91 may be referred to as a remote radio unit (English: remote radio unit, RRU for short), a transceiver unit, a transceiver machine, a transceiver circuit, or the like. The transceiver 91 may include at least one antenna 911 and a radio frequency unit 912.

The transceiver 91 is mainly configured to: receive and send a radio frequency signal and perform conversion between the radio frequency signal and a baseband signal. The processor 92 is mainly configured to perform baseband processing, control the base station, and the like. The transceiver 91 and the baseband unit 92 may be physically disposed together, or may be physically separated. In other words, the base station is a distributive base station.

The baseband unit 92 is mainly used to complete a baseband processing function, such as channel coding, multiplexing, modulation, or spectrum spreading.

In an example, the baseband unit 92 may include one or more boards, and the plurality of boards may jointly support a radio access network (for example, an LTE network) of a single access standard, or may respectively support radio access networks of different access standards. The baseband unit 92 includes a processor 921. The processor 921 may be configured to control the base station shown in FIG. 9 to perform the procedure performed by the base station in each of the foregoing embodiments. In some embodiments, the baseband unit 92 may further include a memory 922, configured to store a necessary instruction and necessary data.

The processor 921 is configured to determine, based on a predetermined resource mapping relationship, time-frequency resources respectively occupied by a preamble sequence and service data that are in a cell covered by the base station.

The transceiver 91 is configured to receive, on the determined time-frequency resources, the preamble sequence and the service data that are sent by UE, where the UE has obtained downlink synchronization with the cell, but has not obtained uplink synchronization with the cell.

The processor 921 is further configured to: determine a scrambling code, where the scrambling code is in a one-to-one correspondence with the received preamble sequence, or the scrambling code is in a one-to-one correspondence with an identifier of the UE, or the scrambling code is in a one-to-one correspondence with a combination of the received preamble sequence and an identifier of the UE; and descramble, based on the scrambling code, the service data sent by the UE, to obtain descrambled service data.

The transceiver 91 is further configured to send a random access response to the UE based on the preamble sequence.

When the base station provided in this embodiment of this application receives an MSG 1, the base station receives, on the time-frequency resources having a mapping relationship, the preamble sequence and the service data that are sent by the UE. In other words, the MSG 1 carries both the preamble and the service data. Therefore, the base station does not need to provide a service for the UE after waiting for completion of a random access process, thereby reducing a service delay.

In some embodiments, the transceiver 91 is further configured to send a resource mapping indicator to the UE, where the resource mapping indicator is used to indicate the predetermined resource mapping relationship.

In some embodiments, the transceiver 91 is further configured to: before receiving the preamble sequence and the service data that are sent by the UE, send a first scrambling code mapping indication to the UE, where the first scrambling code mapping indication is used to indicate a mapping mode of a preamble sequence and a scrambling code.

In some embodiments, the transceiver 91 is further configured to: before receiving the preamble sequence and the service data that are sent by the UE, send a second scrambling code mapping indication to the UE, where the second scrambling code mapping indication is used to indicate a mapping mode of a preamble sequence and an identifier of the UE.

In some embodiments, the transceiver 91 is further configured to: before receiving the preamble sequence and the service data that are sent by the UE, send a third scrambling code mapping indication to the UE, where the third scrambling code mapping indication is used to indicate a mapping mode of a preamble sequence and a combination of the preamble sequence and an identifier of the UE.

In some embodiments, to improve transmission reliability of the service data, the UE further codes to-be-sent data before scrambling the to-be-sent service data. Correspondingly, the base station also needs to decode the received service data after descrambling the received service data. In this case, the processor 921 is further configured to: after obtaining the descrambled service data, decode the descrambled service data based on a decoding scheme corresponding to a predetermined coding scheme. The transceiver 91 is further configured to: before receiving the preamble sequence and the service data that are sent by the UE, send a coding scheme indicator to the UE, where the coding scheme indicator is used to indicate the predetermined coding scheme.

For manners of sending the scrambling code mapping indications, the resource mapping indicator, and the coding scheme indicator, and more implementation details, refer to the descriptions in the foregoing method embodiment. Details are not described herein again.

An embodiment in accordance with the disclosure further provides a random access system of UE. The random access system includes a base station and the UE. For a structure of the base station, refer to the descriptions in FIG. 9. For a structure of the UE, refer to the descriptions in FIG. 8. For a process of interaction between the base station and the UE, refer to the descriptions in the foregoing method embodiment.

All or some of the foregoing embodiments may be implemented by using of software, hardware, firmware, or any combination thereof. When the software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (such as a floppy disk, a hard disk, or a magnetic tape), an optical medium (for example, a DVD), a semiconductor medium (for example, a solid state disk Solid State Disk (SSD)), or the like.

Apparently, a person skilled in the art can make various modifications and variations to the present invention without departing from the scope of the present invention. The present invention is intended to cover these modifications and variations provided that the modifications and variations in this application fall within the scope of the claims of the present invention.

The invention claimed is:

1. A random access method, comprising:
   determining, by a user equipment (UE), a preamble sequence;
   generating, by the UE, a scrambling code, wherein the scrambling code is based on the preamble sequence;
   scrambling, by the UE, data based on the scrambling code to obtain scrambled data;
   determining, by the UE based on a predetermined resource mapping relationship, time-frequency resources for sending the scrambled data; and
   sending, by the UE on the determined time-frequency resources, the scrambled data to a base station,
   wherein a first symbol is occupied by the scrambled data, a second symbol is occupied by the preamble sequence, and at least one third symbol different from the first symbol and the second symbol is between the first symbol and the second symbol.

2. The method according to claim 1, wherein the determining, by the UE based on the predetermined resource mapping relationship, the time-frequency resources for sending the scrambled data comprises:
   receiving, by the UE, a resource mapping indicator from the base station, wherein the resource mapping indicator indicates the predetermined resource mapping relationship; and
   determining, by the UE based on the predetermined resource mapping relationship indicated by the resource mapping indicator, the time-frequency resources for sending the scrambled data.

3. The method according to claim 2, wherein the resource mapping indicator is notified by the base station to the UE by using a physical broadcast channel (PBCH), a system information (SI) message, or a physical downlink control channel (PDCCH).

4. The method according to claim 1, wherein the first symbol is an orthogonal frequency division multiplexing (OFDM) symbol occupied by the scrambled data, the first symbol is after the second symbol, the second symbol is an OFDM symbol occupied by the preamble sequence, and the third symbol is an OFDM symbol other than the OFDM symbol occupied by the scrambled data and the OFDM symbol occupied by the preamble sequence.

5. The method according to claim 1, wherein the predetermined resource mapping relationship is configured by the base station for the UE.

6. A random access method, comprising:
   determining, by a base station based on a predetermined resource mapping relationship, time-frequency resources for receiving data;
   receiving, by the base station on the determined time-frequency resources, scrambled data from a user equipment (UE);
   generating, by the base station, a scrambling code, wherein the scrambling code is based on a preamble sequence; and
   descrambling, by the base station based on the scrambling code, the scrambled data from the UE, to obtain descrambled data.

7. The method according to claim 6, wherein before receiving the scrambled data from the UE, the method further comprises:
   sending, by the base station, a resource mapping indicator to the UE, wherein the resource mapping indicator indicates the predetermined resource mapping relationship.

8. The method according to claim 7, wherein the resource mapping indicator is notified by the base station to the UE by using a physical broadcast channel (PBCH), a system information (SI) message, or a physical downlink control channel (PDCCH).

9. The method according to claim 6, wherein an orthogonal frequency division multiplexing (OFDM) symbol occupied by the scrambled data is after an OFDM symbol occupied by the preamble sequence, and at least one other OFDM symbol is between the OFDM symbol occupied by the scrambled data and the OFDM symbol occupied by the preamble sequence.

10. The method according to claim 6, wherein the predetermined resource mapping relationship is configured by the base station for the UE.

11. A communication apparatus, comprising:
    a processor, configured to:
      determine a preamble sequence;
      generate a scrambling code, wherein the scrambling code is based on the preamble sequence;
      scramble data based on the scrambling code to obtain scrambled data; and
      determine, based on a predetermined resource mapping relationship, time-frequency resources for sending the scrambled data; and
    a transceiver, configured to:
    send, on the determined time-frequency resources, the scrambled data to a base station,
    wherein a first symbol is occupied by the scrambled data, a second symbol is occupied by the preamble sequence, and at least one third symbol different from the first symbol and the second symbol is between the first symbol and the second symbol.

12. The communication apparatus according to claim 11, wherein
    the transceiver is further configured to receive a resource mapping indicator from the base station,
    the resource mapping indicator indicates the predetermined resource mapping relationship, and
    the processor is further configured to determine, based on the predetermined resource mapping relationship indicated by the resource mapping indicator, the time-frequency resources for sending the scrambled data.

13. The communication apparatus according to claim 11, wherein the first symbol is an orthogonal frequency division multiplexing (OFDM) symbol occupied by the scrambled data, the first symbol is after the second symbol, the second symbol is an OFDM symbol occupied by the preamble sequence, and the third symbol is an OFDM symbol other than the OFDM symbol occupied by the scrambled data and the OFDM symbol occupied by the preamble sequence.

14. The communication apparatus according to claim 11, wherein the predetermined resource mapping relationship is configured by the base station for the communication apparatus.

15. A communication apparatus, comprising:
a processor, configured to:
   determine, based on a predetermined resource mapping relationship, time-frequency resources for receiving data; and
a transceiver, configured to:
   receive, on the determined time-frequency resources, scrambled data from a user equipment (UE),
wherein the processor is further configured to:
   generate, a scrambling code, wherein the scrambling code is based on a preamble sequence; and
   descramble, based on the scrambling code, the scrambled data from the UE, to obtain descrambled data.

16. The communication apparatus according to claim 15, wherein
the transceiver is further configured to send a resource mapping indicator to the UE, and
the resource mapping indicator indicates the predetermined resource mapping relationship.

17. The communication apparatus according to claim 15, wherein an orthogonal frequency division multiplexing (OFDM) symbol occupied by the scrambled data is after an OFDM symbol occupied by the preamble sequence, and at least one other OFDM symbol is between the OFDM symbol occupied by the scrambled data and the OFDM symbol occupied by the preamble sequence.

18. The communication apparatus according to claim 15, wherein the predetermined resource mapping relationship is configured by the communication apparatus for the UE.

19. The method according to claim 1, wherein the first symbol is after the second symbol.

20. The method according to claim 1, wherein the first symbol is an orthogonal frequency division multiplexing (OFDM) symbol occupied by the scrambled data, the second symbol is an OFDM symbol occupied by the preamble sequence, and the third symbol is an OFDM symbol other than the OFDM symbol occupied by the scrambled data and the OFDM symbol occupied by the preamble sequence.

* * * * *